United States Patent
Sato et al.

(10) Patent No.: US 12,292,613 B2
(45) Date of Patent: May 6, 2025

(54) OPTICAL CABLE AND OPTICAL-CABLE MANUFACTURING METHOD

(71) Applicant: FUJIKURA LTD., Tokyo (JP)

(72) Inventors: Hironori Sato, Sakura (JP); Akira Namazue, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 280 days.

(21) Appl. No.: 18/013,324

(22) PCT Filed: Jun. 15, 2021

(86) PCT No.: PCT/JP2021/022747
§ 371 (c)(1),
(2) Date: Dec. 28, 2022

(87) PCT Pub. No.: WO2022/004362
PCT Pub. Date: Jan. 6, 2022

(65) Prior Publication Data
US 2023/0251450 A1    Aug. 10, 2023

(30) Foreign Application Priority Data
Jul. 1, 2020    (JP) .................................. 2020-114332

(51) Int. Cl.
*G02B 6/44*    (2006.01)
(52) U.S. Cl.
CPC .................................... *G02B 6/448* (2013.01)
(58) Field of Classification Search
CPC ....................................................... G02B 6/448
USPC ........................................................ 385/114
See application file for complete search history.

(56) References Cited

U.S. PATENT DOCUMENTS

| 2014/0233899 A1 | 8/2014 | Miyamoto et al. |
| 2020/0183113 A1 | 6/2020 | Kumar et al. |

FOREIGN PATENT DOCUMENTS

| CN | 106132269 B | 5/2018 | |
| CN | 110337603 A | 10/2019 | |
| JP | H06138353 A | * 5/1994 | ............... G02B 6/44 |
| JP | 2007233252 A | 9/2007 | |
| JP | 2010286735 A | * 12/2010 | ............... G02B 6/44 |

(Continued)

OTHER PUBLICATIONS

Office Action issued in corresponding Taiwanese Patent Application No. 110123259, dated Jun. 22, 2022 (3 pages).

*Primary Examiner* — Jerry M Blevins
(74) *Attorney, Agent, or Firm* — Osha Bergman Watanabe & Burton LLP

(57) ABSTRACT

An optical cable includes optical fiber units each of which includes intermittently-coupled optical fiber ribbons. In at least one of the optical fiber units, in a cross section perpendicular to a longitudinal direction of the at least one of the optical fiber units, a length of a vector GU is shorter than a largest length of vectors MG of the intermittently-coupled optical fiber ribbons forming the at least one of the optical fiber units, where, in each of the intermittently-coupled optical fiber ribbons, each of the vectors MG is a vector starting from M and ending at G, M is a midpoint between optical fibers at both ends of the each of the intermittently-coupled optical fiber ribbons, and G is a center of gravity of the each of the intermittently-coupled optical fiber ribbons, and the vector GU is a resultant vector of the vectors MG.

14 Claims, 22 Drawing Sheets

(56) References Cited

FOREIGN PATENT DOCUMENTS

| | | | | |
|---|---|---|---|---|
| JP | 2011081089 A | | 4/2011 | |
| JP | 2011-169939 A | | 9/2011 | |
| JP | 2011221320 A | * | 11/2011 | ............... G02B 6/44 |
| JP | 2012027164 A | | 2/2012 | |
| JP | 2014016530 A | | 1/2014 | |
| JP | 2016148709 A | | 8/2016 | |
| JP | 2019159078 A | | 9/2019 | |
| TW | I537620 B | | 6/2016 | |
| WO | 2019/088255 A1 | | 5/2019 | |

* cited by examiner

| | MIDPOINT M | | CENTER OF GRAVITY G | | VECTOR MG | | |
|---|---|---|---|---|---|---|---|
| RIBBON NO. | X-COORDINATE | Y-COORDINATE | X-COORDINATE | Y-COORDINATE | X-COMPONENT | Y-COMPONENT | LENGTH |
| 1 | -1.10 | 1.13 | -1.10 | 1.37 | 0.01 | 0.25 | 0.25 |
| 2 | -0.74 | 0.86 | -0.71 | 0.96 | 0.03 | 0.10 | 0.11 |
| 3 | -0.98 | 0.83 | -0.96 | 0.75 | 0.02 | -0.09 | 0.09 |
| 4 | -1.32 | 0.61 | -1.34 | 0.59 | -0.02 | -0.02 | 0.03 |
| 5 | -1.54 | 0.50 | -1.63 | 0.40 | -0.09 | -0.10 | 0.13 |
| 6 | -1.39 | 0.19 | -1.38 | -0.05 | 0.00 | -0.23 | 0.23 |

| VECTOR GU | | |
|---|---|---|
| X-COMPONENT | Y-COMPONENT | LENGTH |
| -0.05 | -0.10 | 0.11 |

| Xmin | 0.1 | 0.23 | 0.5 | 0.82 | 0.95 | 1.1 | 1.42 | 1.59 | 1.74 | 2.93 |
|---|---|---|---|---|---|---|---|---|---|---|
| Δmax | 0.01 | 0.012 | 0.026 | 0.05 | 0.068 | 0.16 | 0.28 | 0.3 | 0.44 | 0.62 |
| EVALUATION | GOOD | GOOD | GOOD | GOOD | GOOD | POOR | POOR | POOR | POOR | POOR |

| L/L0 | 0.008 | 0.043 | 0.081 | 0.129 | 0.149 | 0.155 | 0.191 | 0.208 | 0.225 | 0.242 | 0.290 |
|---|---|---|---|---|---|---|---|---|---|---|---|
| RESULT | EXCELLENT | EXCELLENT | EXCELLENT | EXCELLENT | EXCELLENT | GOOD | GOOD | GOOD | GOOD | POOR | POOR |

FIG. 12

| RIBBON NO. | VECTOR MG (NONDIMENSIONALIZED) | | | | |
|---|---|---|---|---|---|
| | UNIT NO. | | | | |
| | 1 | 2 | 3 | 4 | 5 |
| 1 | 0.090 | 0.095 | 0.037 | 0.061 | 0.046 |
| 2 | 0.038 | 0.110 | 0.008 | 0.016 | 0.010 |
| 3 | 0.032 | 0.148 | 0.015 | 0.048 | 0.012 |
| 4 | 0.011 | 0.088 | 0.009 | 0.034 | 0.026 |
| 5 | 0.048 | 0.079 | 0.012 | 0.008 | 0.082 |
| 6 | 0.085 | 0.076 | 0.030 | 0.033 | 0.035 |
| MEAN | 0.051 | 0.099 | 0.018 | 0.033 | 0.035 |
| STANDARD DEVIATION | 0.028 | 0.025 | 0.011 | 0.018 | 0.024 |

| Xmin | 0.95 | 0.94 | 0.96 | 0.93 | 0.94 | 0.91 | 0.92 | 0.92 | 0.97 | 0.94 |
|---|---|---|---|---|---|---|---|---|---|---|
| Ymin | 0.003 | 0.006 | 0.011 | 0.015 | 0.018 | 0.028 | 0.042 | 0.047 | 0.053 | 0.065 |
| Δmax | 0.121 | 0.144 | 0.089 | 0.072 | 0.071 | 0.013 | 0.055 | 0.028 | 0.048 | 0.039 |
| EVALUATION | GOOD | GOOD | EXCELLENT | EXCELLENT | EXCELLENT | EXCELLENT | EXCELLENT | EXCELLENT | EXCELLENT | EXCELLENT |

| L1/L0 | 0.002 | 0.135 | 0.205 | 0.311 | 0.490 | 0.728 | 0.952 | 1.267 | 1.322 | 1.490 | 1.633 |
|---|---|---|---|---|---|---|---|---|---|---|---|
| RESULT | POOR | POOR | GOOD | GOOD | EXCELLENT | EXCELLENT | EXCELLENT | EXCELLENT | GOOD | GOOD | POOR |

FIG. 15

| RIBBON NO. | END-TO-END DISTANCE (NONDIMENSIONALIZED) | | | | |
|---|---|---|---|---|---|
| | UNIT NO. | | | | |
| | 1 | 2 | 3 | 4 | 5 |
| 1 | 0.872 | 0.673 | 0.989 | 0.879 | 0.993 |
| 2 | 0.857 | 0.697 | 0.976 | 0.645 | 0.927 |
| 3 | 0.834 | 0.396 | 1.132 | 0.847 | 1.018 |
| 4 | 0.850 | 0.632 | 0.963 | 0.932 | 0.910 |
| 5 | 0.850 | 0.740 | 0.975 | 0.792 | 0.748 |
| 6 | 0.814 | 0.711 | 0.831 | 0.788 | 1.060 |
| MEAN | 0.846 | 0.641 | 0.978 | 0.814 | 0.943 |
| STANDARD DEVIATION | 0.018 | 0.115 | 0.087 | 0.091 | 0.101 |

| Xmin | 0.97 | 0.99 | 0.91 | 0.91 | 0.93 | 0.93 | 0.94 | 0.98 | 0.93 | 0.99 |
|---|---|---|---|---|---|---|---|---|---|---|
| Zmin | 0.002 | 0.012 | 0.011 | 0.018 | 0.031 | 0.062 | 0.075 | 0.12 | 0.133 | 0.182 |
| $\Delta$max | 0.139 | 0.144 | 0.121 | 0.089 | 0.052 | 0.043 | 0.038 | 0.021 | 0.022 | 0.011 |
| EVALUATION | GOOD | GOOD | GOOD | EXCELLENT | EXCELLENT | EXCELLENT | EXCELLENT | EXCELLENT | EXCELLENT | EXCELLENT |

|  | FIRST COMPARATIVE EXAMPLE | SECOND COMPARATIVE EXAMPLE | THIRD COMPARATIVE EXAMPLE | FOURTH COMPARATIVE EXAMPLE | PRESENT EMBODIMENT |
|---|---|---|---|---|---|
| RIBBON SURFACE SHAPE | FLAT | ARCH | SPIRAL | TRIANGULAR SHAPE FAN SHAPE | ALMOST RANDOM |
| LENGTH OF VECTOR MG | ZERO | SMALL | SMALL | LARGE | SMALL TO LARGE |
| VARIANCE OF VECTORS MG | NONE | SMALL | SMALL | SMALL | LARGE |
| LENGTH OF VECTOR GU | ZERO | MEDIUM | MEDIUM | LARGE | SMALL |
| END-TO-END DISTANCE | LARGE | LARGE | SMALL | SMALL | SMALL TO LARGE |
| VARIANCE OF END-TO-END DISTANCES | NONE | SMALL | ALMOST NONE | SMALL | LARGE |
| BENDING DIRECTION | NONE | ONE DIRECTION | ONE DIRECTION | ONE DIRECTION | BOTH DIRECTIONS |
| MAXIMUM TRANSMISSION LOSS | POOR | POOR | POOR | POOR | GOOD |

FIG. 18

OPTICAL CABLE AND OPTICAL-CABLE MANUFACTURING METHOD

TECHNICAL FIELD

The present invention relates to an optical cable and an optical-cable manufacturing method.

BACKGROUND

There is a known technique for forming an optical fiber cable using an optical fiber unit which is an optical fiber assembly formed by a plurality of optical fibers bundled together. In a method commonly used for this, a roughly-winding thread (a bundling member) is wrapped around the bundle of optical fibers to keep the bundle of optical fibers from coming apart, and the color of the bundling member is used for identification of the optical fiber unit. For example, PTL 1 discloses a technique for forming an optical fiber unit by bundling a plurality of optical fiber ribbons together to make a bundle.

PATENT LITERATURE

[PTL 1] Japanese Patent Application Publication No. 2007-233252

In a case where an optical fiber unit is formed by bundling a plurality of optical fiber ribbons together, it is a common practice that, as described in PTL 1, the plurality of the optical fiber ribbons are bundled together in a stacked manner (in a manner that the optical fiber ribbons are overlaid on top of one another). However, when an optical cable is formed using an optical fiber unit formed by a plurality of optical fiber ribbons that are bundled together in a stacked manner as described in PTL 1, there is a concern that when the optical cable receives a load (such as, e.g., a bend or a temperature change), the load may be concentrated at particular optical fibers, which consequently increases transmission loss.

SUMMARY

One or more embodiments of the present invention reduce load concentration at particular optical fibers.

One or more embodiments of the invention provide an optical cable comprising a plurality of optical fiber units, wherein the optical fiber unit has a plurality of intermittently-coupled optical fiber ribbons, in a cross section perpendicular to a longitudinal direction, at least one of the optical fiber units is such that a length of a vector GU is shorter than a largest length of vectors MG of the plurality of the optical fiber ribbons, where the vector MG is a vector starting from a midpoint M and ending at a center of gravity G, M is the midpoint between optical fibers at both ends of each optical fiber ribbon, G is the center of gravity of the optical fiber ribbon, and the vector GU is a resultant vector of the vectors MG of the respective optical fiber ribbons.

Other features of the present invention will become apparent in the following description and the drawings.

The present invention can reduce load concentration at particular optical fibers.

BRIEF DESCRIPTION OF THE DRAWINGS

FIG. 12 is a table showing the relation between the length of the vector MG (nondimensionalized) and an evaluation result of a bending under tension test.

FIG. 15 is a table showing the relation of an end-to-end distance (nondimensionalized) of the optical fiber ribbon 7 and an evaluation result of a bending under tension test.

FIG. 18 is a table comparing the cross-sectional shape of the optical fiber unit 2 of one or more embodiments with those of the comparative examples.

DETAILED DESCRIPTION

Figure 1A:
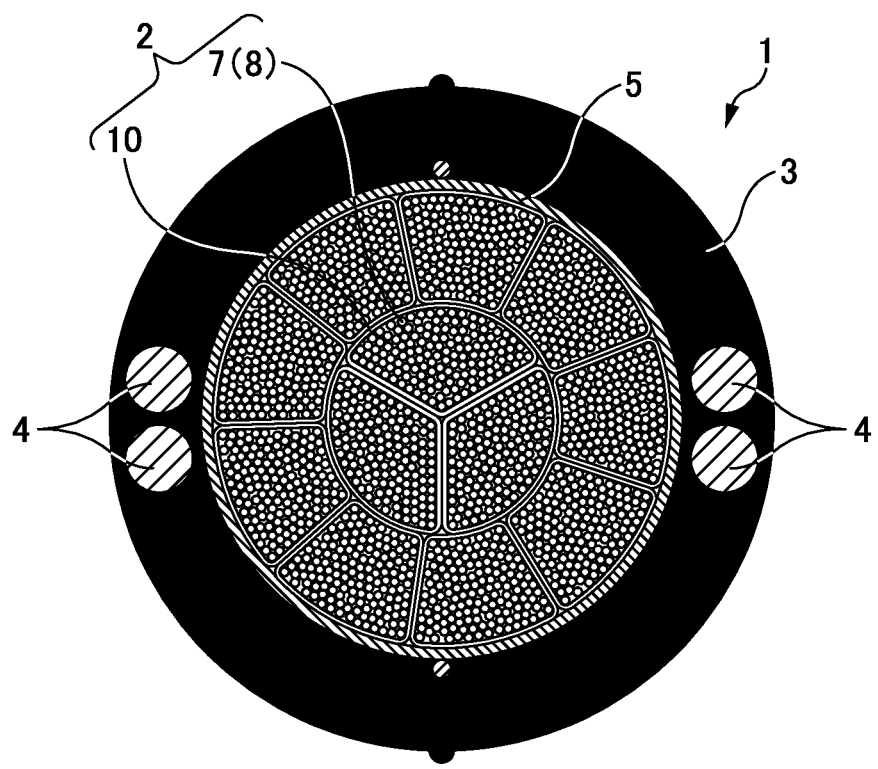
FIG. 1A is a diagram illustrating an optical cable 1.

At least the following matters will become apparent from the following description and the drawings.

An optical cable comprising a plurality of optical fiber units, wherein the optical fiber unit has a plurality of intermittently-coupled optical fiber ribbons, in a cross section perpendicular to a longitudinal direction, at least one of the optical fiber units is such that a length of a vector GU is shorter than a largest length of vectors MG of the plurality of the optical fiber ribbons, where the vector MG is a vector starting from a midpoint M and ending at a center of gravity G, M is the midpoint between optical fibers at both ends of each optical fiber ribbon, G is the center of gravity of the optical fiber ribbon, and the vector GU is a resultant vector of the vectors MG of the respective optical fiber ribbons. Such an optical cable can reduce load concentration at particular optical fibers.

In all the optical fiber units of the optical cable, at least in any given cross section in a longitudinal direction, the length of the vector GU may be shorter than the largest length of the vectors MG of the plurality of the optical fiber ribbons forming the optical fiber unit. This can reduce load concentration at particular optical fibers in every optical fiber unit.

The plurality of optical fiber units may be twisted together, and in all the optical fiber units of the optical cable, in any given cross section taken within a range of a twisting pitch, the length of the vector GU may be shorter than the largest length of the vectors MG of the plurality of the optical fiber ribbons forming the optical fiber unit. This makes it easy for a stress given to optical fibers to be distributed in the longitudinal direction.

The optical fiber unit may have a bundling material bundling the plurality of the optical fiber ribbons. This makes it possible for a plurality of optical fiber ribbons to be held in an irregularly-stacked state.

In at least one of the optical fiber ribbons forming the optical fiber unit, $L/L0$ may be 0.225 or smaller, where L is the length of the vector MG and L0 is a distance between the optical fibers at both ends of the optical fiber ribbon in a flat state. This helps prevent breakage of coupling portions of an intermittently-coupled optical fiber ribbon.

$L/L0$ may further be 0.149 or smaller. This further helps prevent breakage of coupling portions of an intermittently-coupled optical fiber ribbon.

$L/L0$ may be 0.225 or smaller in all the optical fiber ribbons forming the optical fiber unit. This helps prevent breakage of coupling portions of all the optical fiber ribbons.

A standard deviation of $L/L0$ may be 0.011 or greater, where L is the length of the vector MG and L0 is a distance between the optical fibers at both ends of the optical fiber ribbon in a flat state. When the lengths of the vectors MG thus vary, a stress given to the optical fibers can be distributed easily, and thus, load concentration at particular optical fibers can be reduced.

In at least one of the optical fiber ribbons forming the optical fiber unit, $L1/L0$ may be 0.205 or greater and 1.490 or smaller, where L1 is a distance between the optical fibers at both ends of the optical fiber ribbon and L0 is a distance between the optical fibers at both ends of the optical fiber ribbon in a flat state. This helps prevent breakage of coupling portions of an intermittently-coupled optical fiber ribbon.

$L1/L0$ may further be 0.490 or greater and 1.267 or smaller. This further helps prevent breakage of coupling portions of an intermittently-coupled optical fiber ribbon.

$L1/L0$ may be 0.205 or greater and 1.490 or smaller in all the optical fiber ribbons forming the optical fiber unit. This helps prevent breakage of coupling portions of all the optical fiber ribbons.

A standard deviation of $L1/L0$ of the plurality of the optical fiber ribbons may be 0.018 or greater where L1 is a distance between the optical fibers at both ends of each optical fiber ribbon and L0 is a distance between the optical fibers at both ends of the optical fiber ribbon in a flat state. When the distances L1 between the optical fibers at both ends of the optical fiber ribbons thus vary, a stress given to the optical fibers can be distributed easily, and thus, load concentration at particular optical fibers can be reduced.

In the cross section, at least one of the optical fiber ribbons of the optical fiber unit may have a part that is bent with one side of a ribbon surface being convex and a part that is bent with an opposite side of the ribbon surface being convex. This makes it easy for a stress given to the optical fibers to be distributed in the ribbon width direction, and thus can reduce load concentration at particular optical fibers.

An optical-cable manufacturing method will become apparent comprising: manufacturing an optical fiber unit having a plurality of intermittently-coupled optical fiber ribbons and housing a plurality of the optical fiber units inside a sheath, wherein the optical fiber units are manufactured with a stacked state of the plurality of the optical fiber units being made irregular such that in at least one of the optical fiber units, in a cross section perpendicular to a longitudinal direction, a length of a vector GU is shorter than a largest length of vectors MG of the plurality of the optical fiber ribbons, where the vector MG is a vector starting from a midpoint M and ending at a center of gravity G, M is the midpoint between optical fibers at both ends of each optical fiber ribbon, G is the center of gravity of the optical fiber ribbon, and the vector GU is a resultant vector of the vectors MG of the respective optical fiber ribbons. Such a manufacturing method can manufacture an optical cable capable of reducing load concentration at particular optical fibers.

Configuration of an Optical Cable 1

FIG. 1A is a diagram illustrating an optical cable 1.

The optical cable 1 is a cable housing optical fibers 8. The optical cable 1 of one or more embodiments is what is called a slot-less optical cable, which is an optical cable that does not have a slotted rod having grooves (slots) formed therein to house the optical fibers 8. The optical cable 1 of one or more embodiments has a plurality of optical fiber units 2 and a sheath 3. Although the optical cable 1 is a slot-less optical cable here, the optical cable 1 may be a slotted optical cable having a slotted rod. However, the optical fiber unit 2 to be described later is effective especially when used in a slot-less optical cable 1.

The optical fiber unit 2 is a structure formed by a plurality of optical fibers 8 bundled together. The optical cable 1 of one or more embodiments includes a plurality of optical fiber units 2. A detailed structure of the optical fiber unit 2 will be described later. The plurality of optical fiber units 2 are housed inside the sheath 3, covered by a wrapping tape 5. The plurality of optical fiber units 2 may be housed inside the sheath 3 in a state of being twisted in one direction or in an S-Z configuration. Besides the plurality of optical fiber units 2, a filling may be housed inside the wrapping tape 5. As a filling, for example, an absorbent material may be housed inside, outside, or inside and outside the wrapping tape 5. Also, the wrapping tape 5 may be formed of a water-absorbent tape. Also, the wrapping tape 5 or the filling does not have to be included.

The sheath 3 is a member that sheathes the plurality of optical fiber units 2 (and the wrapping tape 5). The outer shape of the sheath 3 is such that its cross section is substantially circular. In one or more embodiments, the wrapping tape 5 wrapping up the plurality of optical fiber units 2 is housed inside the sheath 3. Also, a tension member 4 is embedded in the sheath 3. Members other than the tension member 4 (such as, e.g., a rip cord) may be embedded in the sheath 3 as well.

Figure 1B:
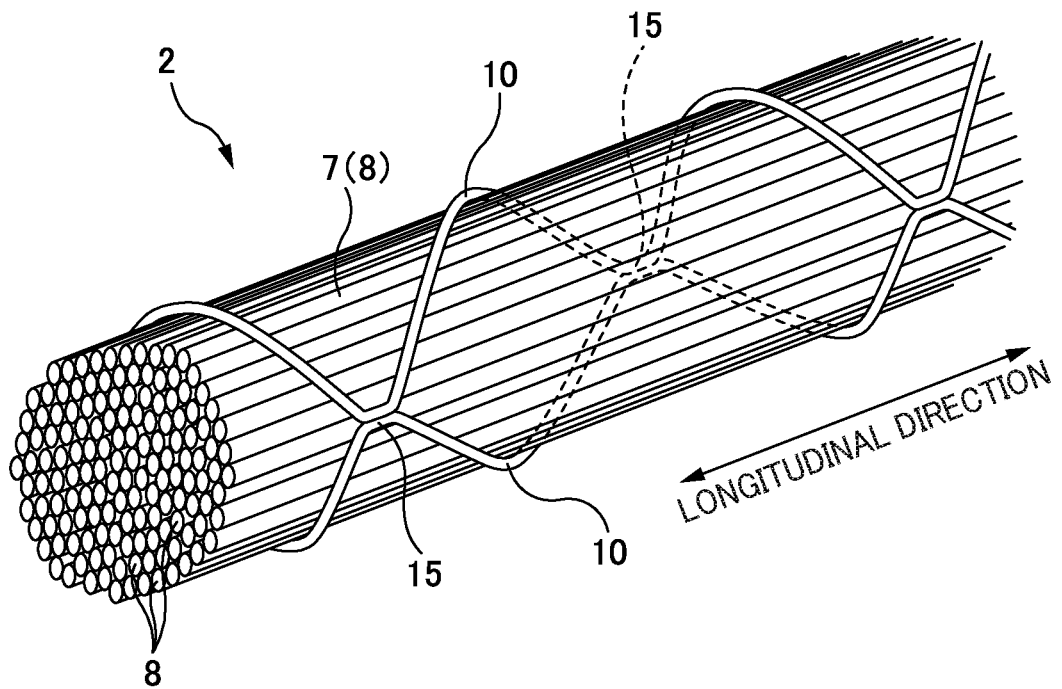
FIG. 1B is a diagram illustrating an optical fiber unit 2.

FIG. 1B is a diagram illustrating the optical fiber unit 2.

The optical fiber unit 2 is a structure formed by a plurality of optical fibers 8 bundled together. The optical fiber unit 2 of one or more embodiments has a plurality of optical fibers 8 bundled together by bundling members 10. However, the optical fiber unit 2 may be a structure formed by a plurality of optical fibers 8 bundled together not by using the bundling members 10, but by being, for example, twisted together. The bundling members 10 are wrapped around the outer circumference of the optical fibers 8 so that the plurality of optical fibers 8 may be bundled together so as not to come apart. The optical fiber unit 2 of one or more embodiments is formed by a plurality of intermittently-coupled optical fiber ribbons 7 bundled together.

Figure 2:
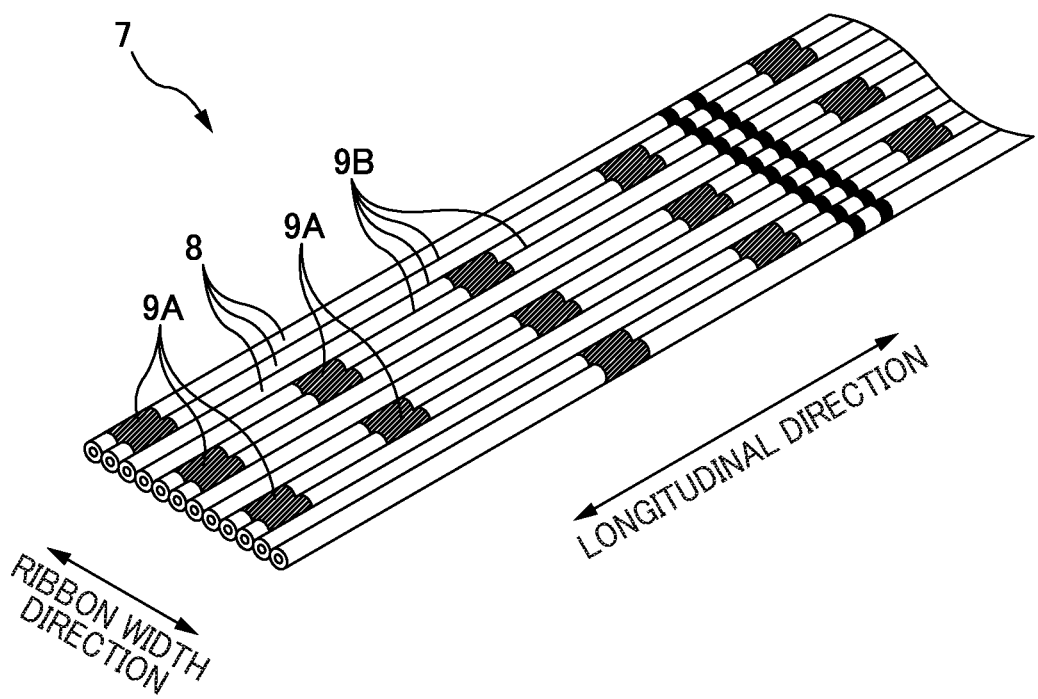
FIG. 2 is a diagram illustrating an intermittently-coupled optical fiber ribbon 7.

FIG. 2 is a diagram illustrating the intermittently-coupled optical fiber ribbon 7.

The intermittently-coupled optical fiber ribbon 7 is an optical fiber ribbon 7 formed by a plurality of (12 here) optical fibers 8 arranged side by side and intermittently coupled. Two adjacent optical fibers 8 are coupled by coupling parts 9A. Between two adjacent optical fibers 8, a plurality of coupling parts 9A are disposed intermittently in the longitudinal direction. Also, the plurality of coupling parts 9A are disposed intermittently two-dimensionally in the longitudinal direction and in the ribbon width direction. Between two adjacent optical fibers 8, regions other than the coupling parts 9A are non-coupling parts 9B. In the non-coupling parts 9B, two adjacent optical fibers 8 are not bound to each other. The optical fiber ribbon 7 is flexibly deformable relative to the ribbon width direction, so that a number of optical fibers 8 can be bundled together at a high density.

Note that the intermittently-coupled optical fiber ribbon 7 is not limited to the one shown in FIG. 2. For example, the location of the coupling parts 9A may be changed. Also, the number of optical fibers 8 forming the intermittently-coupled optical fiber ribbon 7 may be changed. Also, a plurality of sets of optical fibers may be located side by side with each set having a plurality of (e.g., two) adjacent optical fibers, and an optical fiber 8 in one set and an optical fiber 8 in an adjacent set may be intermittently coupled with the coupling parts 9A. Also, the location pattern of the coupling parts 9A that are intermittently located does not have to be any fixed pattern.

The bundling member 10 is a member that bundles a plurality of optical fibers 8 together. The bundling member 10 is a member capable of binding a plurality of optical fibers 8 together and is a member in the shape of, for example, a thread, a cord, or a tape. The bundling member 10 is wrapped around the outer circumference of a bundle of optical fibers 8. Although the optical fibers 8 of the optical fiber unit 2 in FIG. 1B are bundled by two bundling members 10, the number of bundling members 10 in the optical fiber unit 2 may be one or two or more. Also, the optical fiber unit 2 may be without the bundling member 10.

The bundling members 10 are each formed of a composite material of a material with a high melting point and a material with a low melting point and are thermally fused at their intersections. However, the bundling member 10 may be formed not by a composite material but by a single material. For example, the bundling member 10 may be formed of either a material with a high melting point or a material with a low melting point, or the materials of the two bundling members 10 may be different from each other. Also, the bundling members 10 may be joined together with an adhesive instead of being thermally fused to each other. Also, the intersections of the bundling members 10 do not need to be joined.

The two bundling members 10 are, as shown in FIG. 1B, each wrapped around the bundle of optical fibers 8 in an S-Z configuration. Specifically, each of the bundling members 10 is wrapped around a corresponding half of the outer circumference of the bundle of optical fibers 8 while being reversed in the wrap direction at joint portions 15. However, how the bundling member 10 is wrapped is not limited to this. For example, a single bundling member 10 may be helically wrapped around the outer circumference of the bundle of optical fibers 8. Also, two bundling members 10 may be wrapped around the outer circumference of the bundle of optical fibers 8 helically in directions opposite from each other. Although a plurality of optical fiber ribbons 7 are bundled by two cord-shaped bundling members 10 to form the optical fiber unit 2 in one or more embodiments, the configuration of the optical fiber unit 2 is not limited to this. For example, the optical fiber unit 2 may be formed by wrapping a tape-shaped bundling member 10 around the outer circumference of a bundle of a plurality of optical fibers 8 in a covering manner. For example, the bundling member 10 may be formed of a wrapping tape. Also, the bundling member 10 may be formed of a tube such as, for example, a loose tube or a tight buffer tube. The bundling member 10 is attached conforming to the outer shape of the bundle of optical fibers 8 and can thus maintain the outer shape of the bundle of optical fibers 8 (and as a result, can maintain the plurality of the optical fiber ribbons 7 to be in an irregularly-stacked state (to be described later)).

Figure 3:
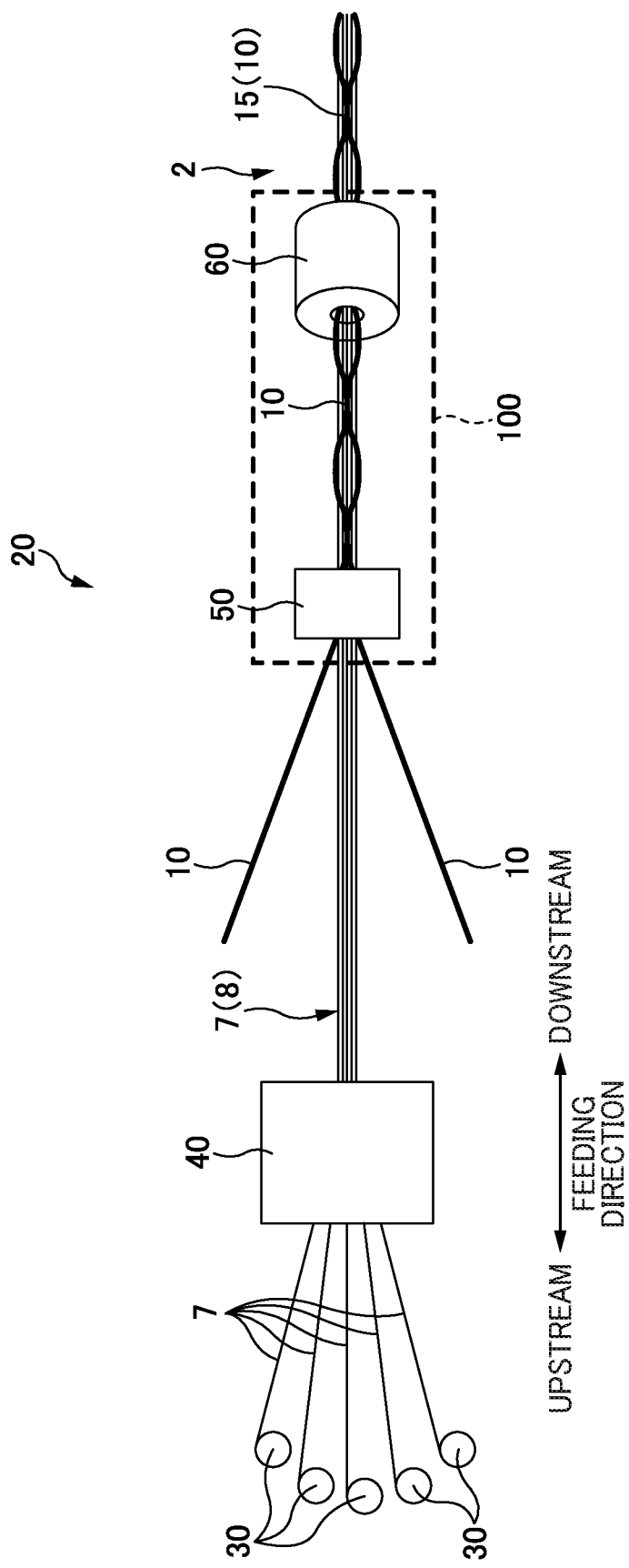
FIG. 3 is a diagram illustrating a unit manufacturing apparatus 20 that manufactures the optical fiber unit 2.

FIG. 3 is a diagram illustrating a unit manufacturing apparatus 20 that manufactures the optical fiber unit 2.

The unit manufacturing apparatus 20 has a plurality of ribbon supply sections 30, an assembling section 40, and a unit formation section 100.

The ribbon supply sections 30 are each an apparatus (a supply source) that supplies the intermittently-coupled optical fiber ribbon 7. For example, the ribbon supply section 30 is formed of a drum (or a bobbin) around which the intermittently-coupled optical fiber ribbon 7 is wound in advance. Note that the ribbon supply section 30 may be formed of an apparatus that manufactures the intermittently-coupled optical fiber ribbon 7. In one or more embodiments, the intermittently-coupled optical fiber ribbons 7 are supplied from the plurality of ribbon supply sections 30 to the assembling section 40.

The assembling section 40 is an apparatus that assembles the plurality of the optical fiber ribbons 7. The assembling section 40 assembles the plurality of intermittently-coupled optical fiber ribbons 7 into a bundle shape. In one or more embodiments, the assembling section 40 supplies the plurality of intermittently-coupled optical fiber ribbons 7 assembled as a bundle to a bundle attaching section 50.

The unit formation section 100 is an apparatus that forms the optical fiber unit 2 by bundling the plurality of the optical fiber ribbons 7 with the bundling members 10. The unit formation section 100 has the bundle attaching section 50 and a bundle joining section 60. However, in a case where no joining with the bundling members 10 is performed, the unit formation section 100 may be without the bundle joining section 60 and include only the bundle attaching section 50.

The bundle attaching section 50 is an apparatus that attaches the bundling members 10 to the outer circumference of the bundle of the plurality of intermittently-coupled optical fiber ribbons 7. In one or more embodiments, the bundle attaching section 50 wraps two bundling members 10 in an S-Z configuration. However, the bundle attaching section 50 is not limited to one that wraps the bundling members 10 in an S-Z configuration, and for example, may wrap the bundling members 10 helically in one direction. Also, in a case where the bundling member is tape-shaped, the bundle attaching section 50 may wrap the bundling member in such a manner as to wrap the bundle of the plurality of the optical fiber ribbons 7 in a covering manner. Also, in a case where the bundling member is a tube, a resin to be the tube may be extruded onto the outer circumference of the bundle of the optical fiber ribbons 7.

Figure 4:
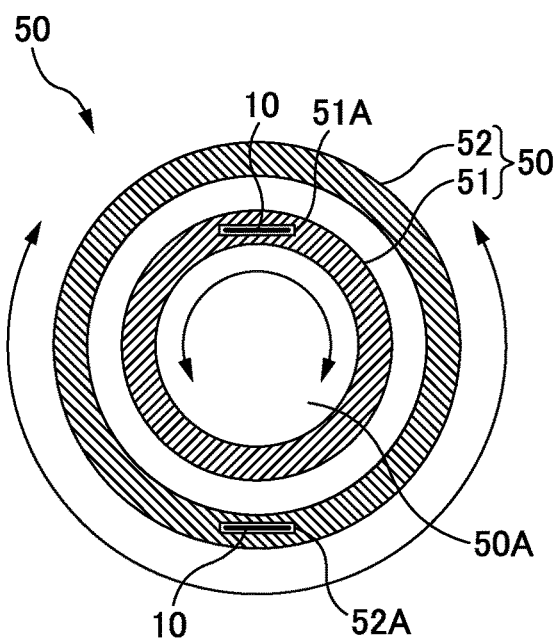
FIG. 4 is a diagram illustrating a bundle attaching section 50.

FIG. 4 is a diagram illustrating the bundle attaching section 50.

The bundle attaching section 50 has a first rotation member 51 and a second rotation member 52. The bundle attaching section 50 has a double cylindrical structure formed by the first rotation member 51 and the second rotation member 52. The first rotation member 51 is a tubular member. The center portion of the first rotation member 51 is a fiber passage portion 50A through which to pass an assembled bundle of the plurality of intermittently-coupled optical fiber ribbons 7. The first rotation member 51 further has a first passage portion 51A through which to pass the bundling member 10. The first rotation member 51 is rotatably located. The second rotation member 52 is a tubular member disposed outside of the first rotation member 51. The second rotation member 52 has a second passage portion 52A through which to pass the bundling member 10. The second rotation member 52 is located to be rotatable relative to the first rotation member 51.

The bundle attaching section 50 oscillates the first rotation member 51 and the second rotation member 52 around a rotation axis in directions opposite from each other. Two bundling members 10 are thereby wrapped in an S-Z configuration around the outer circumference of the bundle of the plurality of intermittently-coupled optical fiber ribbons 7. The plurality of intermittently-coupled optical fiber ribbons 7 and the bundling members 10 are supplied to the bundle joining section 60 while the two bundling members 10 form intersections on the outer circumference of the bundle of the plurality of intermittently-coupled optical fiber ribbons 7. Although a plurality of intersections of the bundling members 10 are formed between the bundle attaching section 50 and the bundle joining section 60 in FIG. 3, the interval between the bundle attaching section 50 and the bundle joining section 60 may be shorter than the longitudinal interval of the intersections of the bundling members 10.

The bundle joining section 60 is an apparatus that joins the two bundling members 10 together. The bundle joining section 60 of one or more embodiments is formed of a tubular heater. The inner wall surface of the tubular heater is a heating surface. When the plurality of intermittently-coupled optical fiber ribbons 7 and the bundling members 10 pass through the inside of the tubular heater, the intersections of the two bundling members 10 are thermally fused, forming the joint portions 15. The optical fiber unit 2 shown in FIG. 1B is thus manufactured. Note that the bundle joining section 60 may join the bundling members 10 with an adhesive instead of joining the bundling members 10 by thermal fusion. Also, as will be described later, the unit formation section 100 may be without the bundle joining section 60 and not join the bundling members 10.

Note that a plurality of the optical fiber units 2 thus manufactured are bundled together and wrapped by the wrapping tape 5, and an extrusion molding apparatus extrudes a melted resin to be the sheath 3 onto the outer side of the wrapping tape 5, thereby manufacturing the optical cable 1.

Cross-Sectional Shape of the Optical Fiber Unit 2

First, the cross-sectional shape of an optical fiber unit of a comparative example is described, and then, the cross-sectional shape of the optical fiber unit 2 of one or more embodiments is described.

Figure 19:
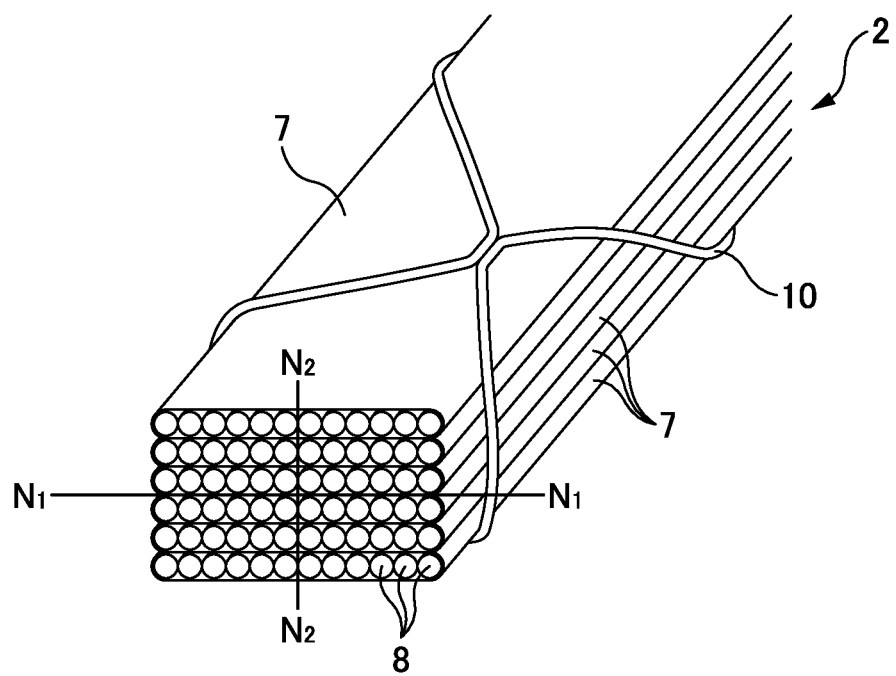
FIG. 19 is a diagram illustrating the cross-sectional shape of an optical fiber unit 2 of a first comparative example.

FIG. 19 is a diagram illustrating the cross-sectional shape of an optical fiber unit 2 of a first comparative example. In the first comparative example, six intermittently-coupled optical fiber ribbons 7 are stacked and bundled by the bundling members 10. In the first comparative example, the optical fiber ribbons 7 are not bent relative to the ribbon width direction and their ribbon surfaces are flat. The flat ribbon surfaces of the respective optical fiber ribbons 7 are parallel to one another, and the flat ribbon surfaces of the respective optical fiber ribbons 7 are aligned. In other words, in the first comparative example, six optical fiber ribbons 7 are stacked regularly.

In the case of the first comparative example shown in FIG. 19, when the optical cable is bent, there is a concern that the load may be concentrated at particular optical fibers 8. For example, if the optical fiber unit 2 is bent with a plane N1-N1 in FIG. 19 as a neutral plane, a tensile stress or a compressive stress is concentrated at the optical fibers 8 forming the first or sixth optical fiber ribbon 7 (an edge one of the stacked optical fiber ribbons 7) in FIG. 19, and the stress is unlikely to be distributed to the other optical fibers 8. Also, if the optical fiber unit 2 is bent with a plane N2-N2 of each optical fiber ribbon 7 in FIG. 19 as a neutral plane, a tensile stress or a compressive stress is concentrated at the first or twelfth fibers (the optical fibers 8 at both ends of the optical fiber ribbons 7) in FIG. 19, and the stress is unlikely to be distributed to the other optical fibers 8. In such a situation where a load is concentrated at particular optical fibers 8 and unlikely to be distributed to the other optical fibers 8, transmission loss increases at the optical fibers 8 where the load is concentrated, consequently increasing the maximum transmission loss (the largest one of the transmission losses of the plurality of optical fibers 8). Therefore, a load may not be concentrated at particular optical fibers 8.

Thus, in one or more embodiments, as will be described next, the optical fiber unit 2 is formed by the plurality of irregularly-stacked optical fiber ribbons 7. One or more embodiments thereby reduce load concentration at particular optical fibers 8 and thereby decrease the maximum transmission loss of the optical cable 1 (or the optical fiber unit 2).

Figure 5A:
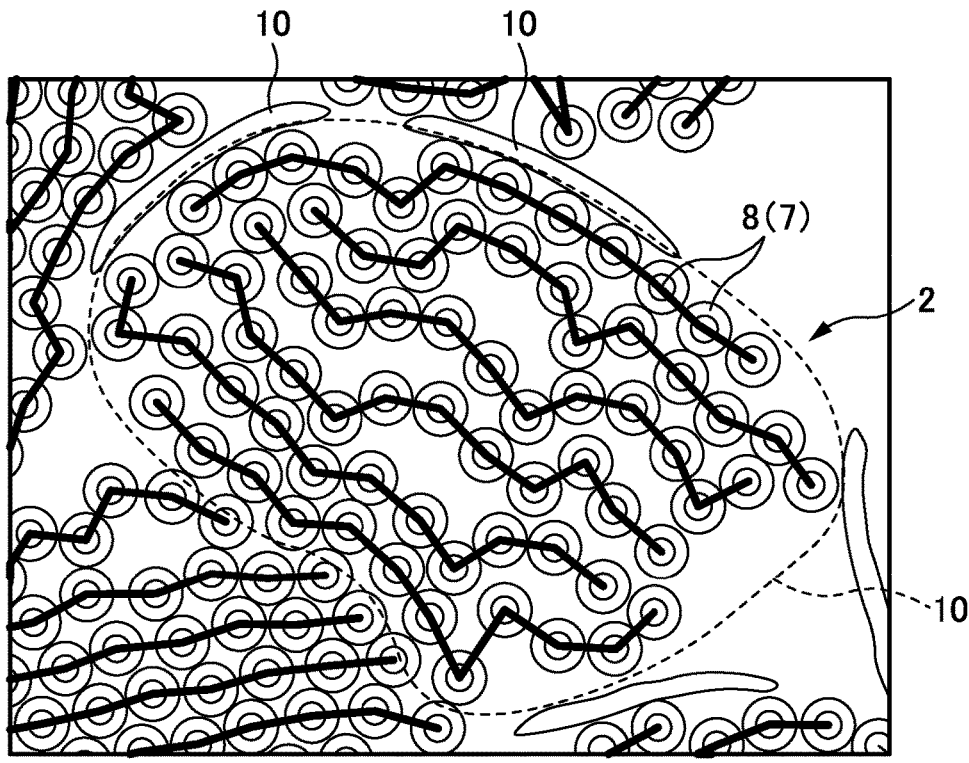
FIG. 5A is a diagram illustrating the cross-sectional shape of the optical fiber unit 2 of the optical cable 1 of one or more embodiments.
Figure 5B:
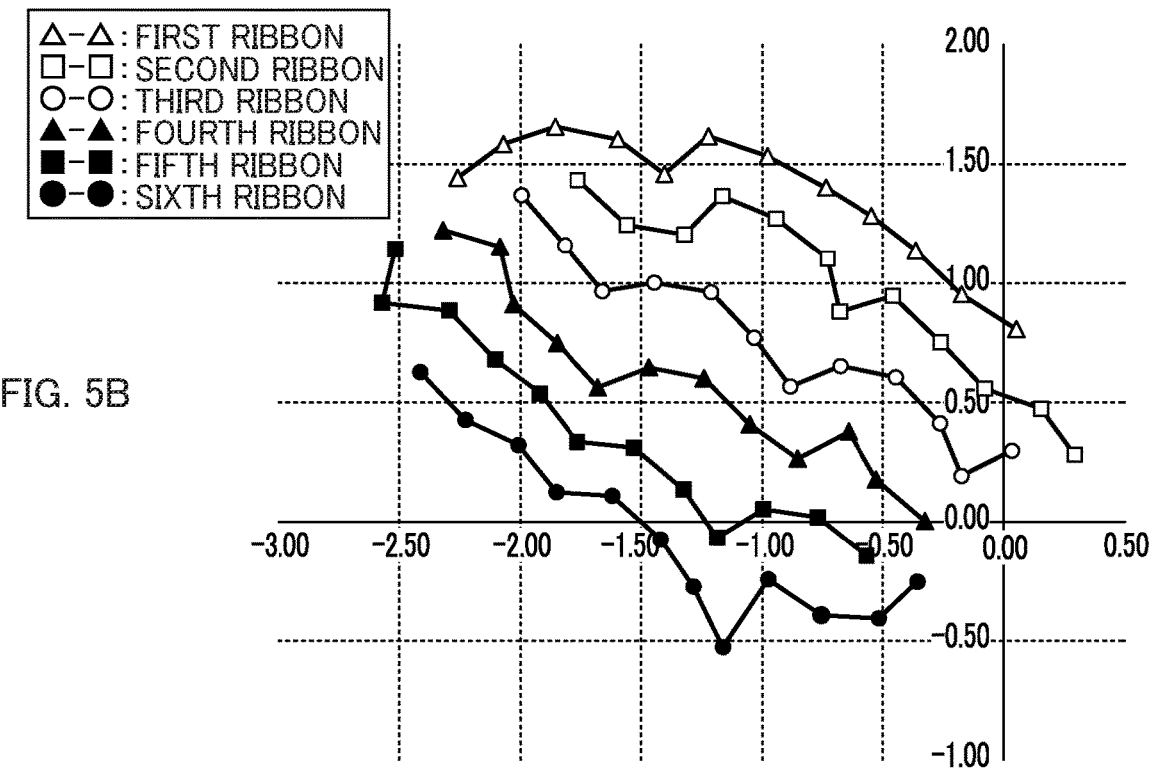
FIG. 5B is a graph showing the coordinates of optical fibers 8 shown in FIG. 5A.

FIG. 5A is a diagram illustrating the cross-sectional shape of the optical fiber unit 2 of the optical cable 1 of one or more embodiments. FIG. 5A is an explanatory diagram depicting a photograph of a cross section of the optical cable 1 of one or more embodiments as a diagrammatic drawing. FIG. 5B is a graph showing the coordinates of the optical fibers 8 shown in FIG. 5A. The graph shown in FIG. 5B shows measurement results of the XY coordinates of each optical fiber 8 based on the cross-sectional photograph (two-dimensional image) of the optical cable 1 of one or more embodiments. To show the arrangement of a plurality of optical fibers 8 forming each optical fiber ribbon 7, FIGS. 5A and 5B depict them with adjacent optical fibers 8 being connected with solid lines.

The optical fiber unit 2 of one or more embodiments is configured such that, as shown in FIG. 5A, a plurality of optical fiber ribbons 7 are in an irregularly-stacked state. Here, "a plurality of optical fiber ribbons 7 being in an irregularly-stacked state" means that the optical fiber ribbons 7 have different relative positional relations compared to the first comparative example in FIG. 19 and the ribbon surface of at least one of the optical fiber ribbons 7 is bent. Note that in a state where the ribbon surface of the optical fiber ribbon 7 is bent, with M being a midpoint between the optical fibers 8 at both ends of the optical fiber ribbon 7 and G being the center of gravity of the optical fiber ribbon 7 in a cross section perpendicular to a longitudinal direction, the midpoint M and the center of gravity G are usually placed offset from each other (it is extremely rare that the midpoint M and the center of gravity G coincide with each other).

Figures 6A, 6B:
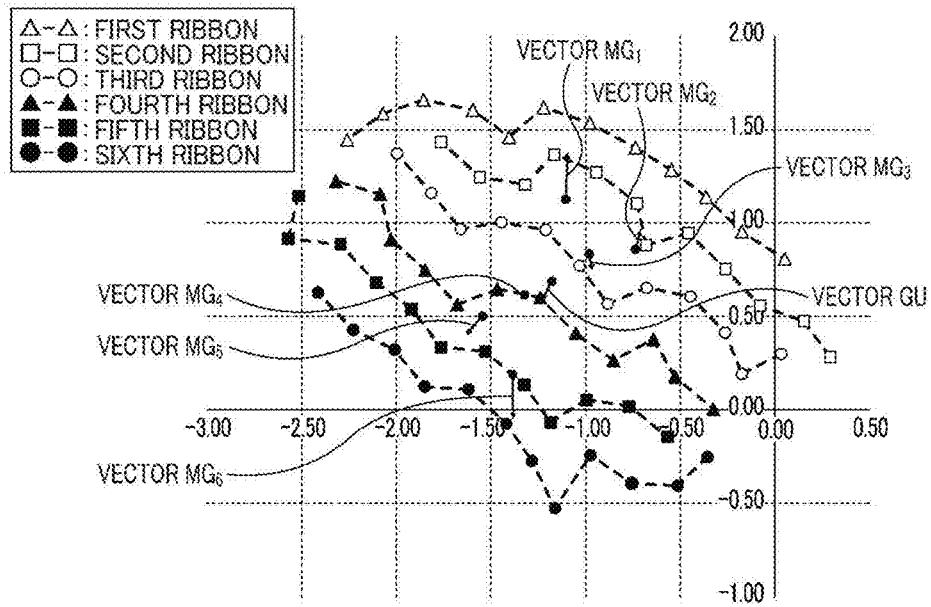
FIGS. 6A and 6B are diagrams illustrating vectors MG and a vector GU.

FIGS. 6A and 6B are diagrams illustrating vectors MG and a vector GU. FIG. 6A shows the vectors MG and the vector GU on a cross section of the optical fiber unit 2 shown in FIG. 5B. FIG. 6B shows, for each of the plurality of the optical fiber ribbons 7 forming the optical fiber unit 2 shown in FIG. 5B, the coordinates of the midpoint M between the optical fibers 8 at both ends thereof and the coordinates of the center of gravity G thereof, and also shows the x-components, y-components, and lengths of each of the vectors MG and the vector GU. Here, the vector MG is a vector starting from the midpoint M and ending at the center of gravity G on a cross section perpendicular to a longitudinal direction. Also, the vector GU is a resultant vector of the vectors MG of the plurality of the optical fiber ribbons 7 (six optical fiber ribbons 7 here) forming the optical fiber unit 2.

As shown in FIGS. 6A and 6B, in this cross section of the optical fiber unit 2, the length of the vector GU is shorter than the largest length of the vectors MG of the plurality of the optical fiber ribbons 7 (six optical fiber ribbons 7 here) forming the optical fiber unit 2 (here, the length of the vector MG of the first ribbon). When the vector GU is shorter than the largest length of the vectors MG like in this case, the optical fiber unit 2 is in a state such that in that cross section, the directions in which the plurality of the optical fiber ribbons 7 are bent (the directions in which the ribbon surfaces are bent relative to the ribbon width direction) are not one-sided toward a particular direction. In other words, the bending directions of the plurality of the optical fiber ribbons 7 (the bending directions of the ribbon surfaces relative to the ribbon width direction) are nearly random. For this reason, no matter which direction the optical cable 1 is bent, in that optical fiber unit 2, the stress given to the optical fibers 8 is easily distributed, and load concentration at particular optical fibers 8 can be reduced compared to the first comparative example. Note that also in a case where the sheath 3 contracts due to a temperature change applied to the optical cable 1, the stress given to the optical fibers 8 of the optical fiber unit 2 is easily distributed, and load concentration at particular optical fibers 8 can be reduced compared to the first comparative example. In other words, when the length of the vector GU on a cross section perpendicular to a longitudinal direction is shorter than the largest length of the vectors MG of the plurality of the optical fiber ribbons 7 forming the optical fiber unit 2, concentration of a load (such as a bend or a temperature change) at particular optical fibers 8 can be reduced, which can in turn decrease the maximum transmission loss of the optical fiber unit 2.

Note that the vector GU does not have to be shorter than the largest length of the vectors MG in all of the optical fiber units 2 in the optical cable 1 on a cross section perpendicular to a longitudinal direction. In other words, it suffices if the vector GU is shorter than the largest length of the vectors MG in at least one of the optical fiber units 2 on a cross section perpendicular to a longitudinal direction. Then, on that cross section, the maximum transmission loss of at least that optical fiber unit 2 can be reduced.

Meanwhile in all the optical fiber units 2 in the optical cable 1, the vector GU may be shorter than the largest length of the vectors MG in at least any given cross section of the optical cable 1 in the longitudinal direction. Then, even if the vector GU is longer than the largest length of the vectors MG in a given optical fiber unit 2 on a cross section at a given position (a first position) in the longitudinal direction, as long as the vector GU of that optical fiber unit 2 is shorter than the largest length of the vectors MG on a cross section at a different position (a second position), when the optical cable 1 is bent (or the optical cable 1 experiences a temperature change) at the given position (the first position), the stress (tensile or compressive stress) given to the optical fibers 8 can be absorbed by the different position (the second position), and consequently, load concentration at particular optical fibers 8 can be reduced. In other words, when the vector GU of the optical fiber unit 2 is shorter than the largest length of the vectors MG on any given cross section in the longitudinal direction, a stress given to the optical fibers 8 can be distributed in the longitudinal direction, and consequently, load concentration at particular optical fibers 8 can be reduced.

In a case where the plurality of optical fiber units 2 forming the optical cable 1 are twisted together, the vector GU may be shorter than the largest length of the vectors MG at any given cross section within the range of a twisting pitch (one pitch) so that a stress (a tensile or compressive stress) given to the optical fibers 8 when the optical cable 1 is bent at the given position (the first position) may easily be absorbed by the different position (the second position), or in other words, so that the stress given to the optical fibers 8 can easily be distributed in the longitudinal direction. In other words, in all the optical fiber units 2 in the optical cable 1, the vector GU may be shorter than the largest length of the vectors MG in any given cross section within the range of the twisting pitch (one pitch). Note that in a case where the plurality of optical fiber units 2 are twisted in one direction, the twisting pitch (one pitch) is a longitudinal length over which the helically disposed optical fiber units 2 make a full circle circumferentially. Also, in a case where the plurality of optical fiber units 2 are twisted in the S-Z configuration, the twisting pitch (one pitch) is a longitudinal length (interval) between a position where the twisting direction is reversed and a position where the twisting direction is reversed in the same direction next time.

Bending Direction of the Ribbon Surface

Figure 7A:
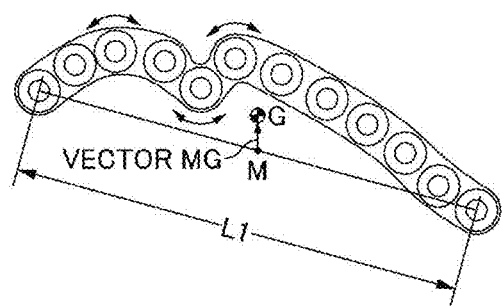
FIG. 7A is a diagram illustrating the cross-sectional shape of the first optical fiber ribbon 7 in FIG. 5A.

FIG. 7A is a diagram illustrating the cross-sectional shape of the first optical fiber ribbon 7 in FIG. 5A. At the locations of the third and sixth optical fibers 8 from the left in FIG. 7A (the locations indicated by arrows on the upper side in FIG. 7A), the optical fiber ribbon 7 is bent relative to the ribbon width direction with the upper ribbon surface in FIG. 7A being convex. Meanwhile, at the location of the fifth optical fiber 8 from the left in FIG. 7A (the location indicated by an arrow on the lower side in FIG. 7A), the optical fiber ribbon 7 is bent relative to the ribbon width direction with the lower ribbon surface in FIG. 7A being convex. In this way, a cross section perpendicular to a longitudinal direction may have a location bending with the ribbon surface of the optical fiber ribbon 7 on one side being convex and a location bending with the ribbon surface on the opposite side being convex.

Figure 7B:
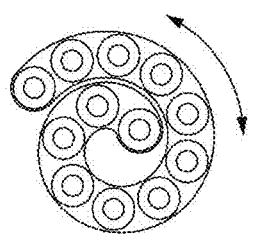
FIG. 7B is a diagram illustrating a comparative case where the optical fiber ribbon 7 is bent in one direction relative to the ribbon width direction.

FIG. 7B is a diagram illustrating a comparative case where the optical fiber ribbon 7 is bent in one direction relative to the ribbon width direction. As indicated by the arrow in FIG. 7B, on the convex side of the ribbon surface, a tensile force is exerted to the optical fibers 8. In a case where the optical fiber ribbon 7 is bent in one direction as in FIG. 7B, the tensile force is accumulated at the convex side of the ribbon surface of each optical fiber 8. Thus, when an additional tensile force is exerted to a given optical fiber 8, the tensile force cannot be easily distributed to the other optical fibers 8, and the tensile force may be concentrated at the particular optical fibers 8. In other words, when the optical fiber ribbon 7 is bent in one direction as in FIG. 7B, it is difficult to distribute the stress given to the optical fiber 8 in the ribbon width direction.

By contrast, in one or more embodiments shown in FIG. 7A, when, for example, a tensile force is exerted to the convex ribbon surface side (the upper side in FIG. 7A) of the third optical fiber 8 from the left, the tensile force can be distributed to the fifth optical fiber 8 from the left (the location bent to be convex on the opposite side). When a cross section perpendicular to a longitudinal direction thus has a location bending with one ribbon surface of the optical fiber ribbon 7 being convex and a location bending with the other ribbon surface being convex, a stress given to the optical fibers 8 can be easily distributed in the ribbon width direction. Consequently, concentration of force at particular optical fibers 8 can be further reduced, and the maximum transmission loss of the optical fiber unit 2 can be further decreased.

How to Make a Stacking State Irregular

Figure 8:
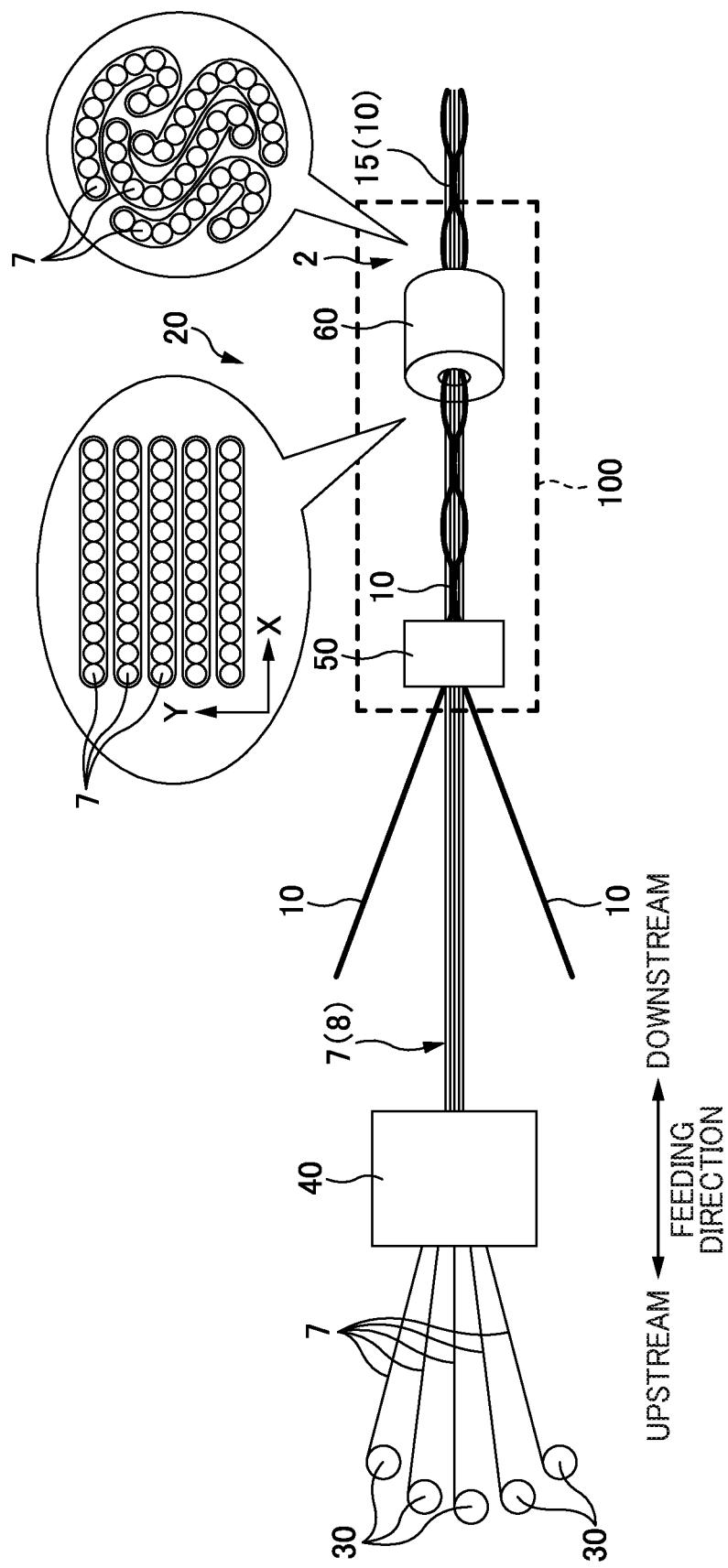
FIG. 8 is a diagram illustrating a first method for manufacturing the optical fiber unit 2 in an irregularly stacked state.
Figure 9:
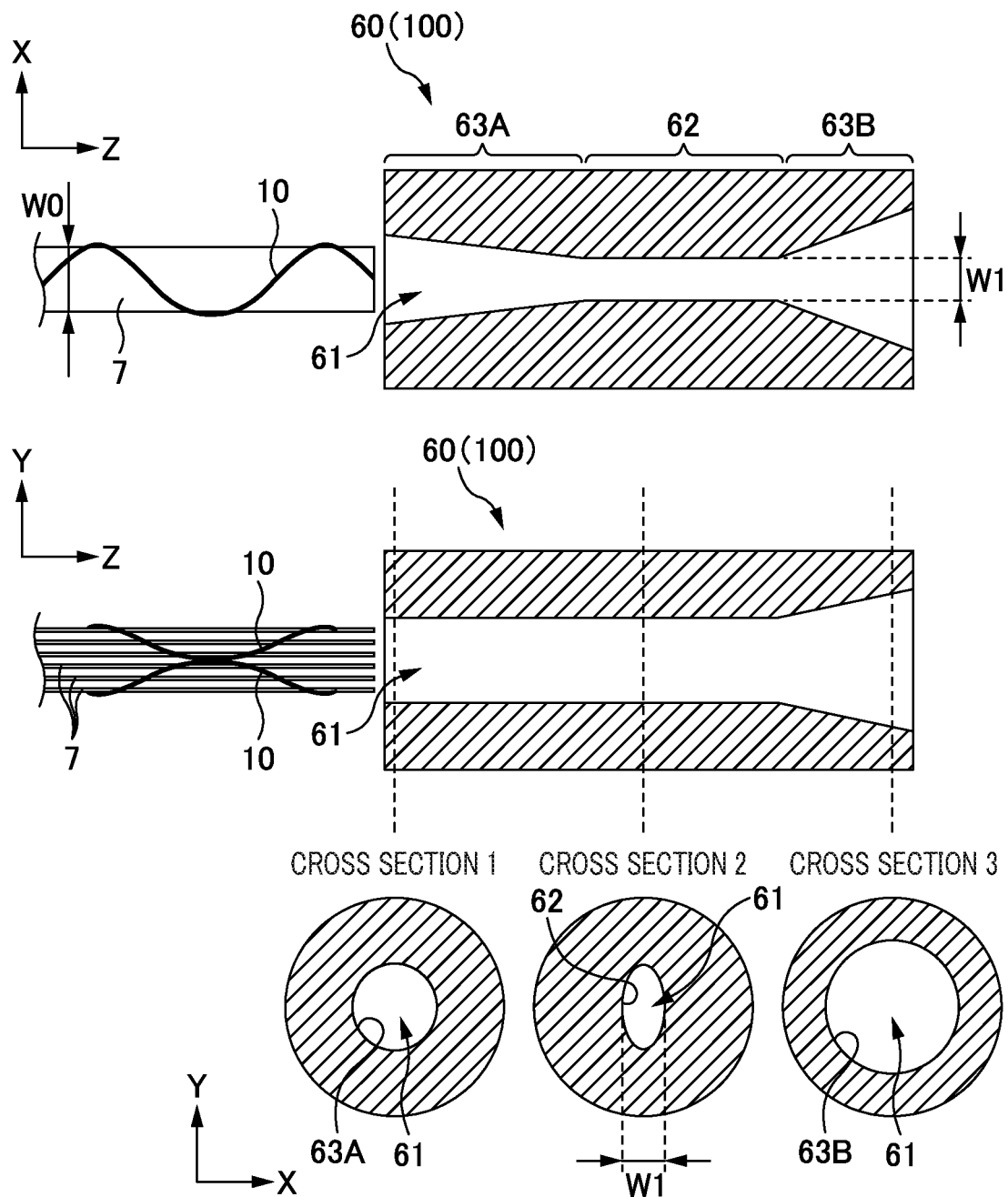
FIG. 9 is a sectional view of a bundle joining section 60 in the first manufacturing method.

FIG. 8 is a diagram illustrating a first method for manufacturing the optical fiber unit 2 in an irregularly-stacked state. FIG. 9 is sectional views of the bundle joining section 60 in the first manufacturing method. The upper part of FIG. 9 is a sectional view of the bundle joining section 60 along an XZ plane (a plane parallel to the ribbon surfaces of the stacked optical fiber ribbons 7). The lower part of FIG. 9 is a sectional view of the bundle joining section 60 taken along a YZ plane (a plane parallel to the stacking direction of the optical fiber ribbons 7 (Y-direction) and the longitudinal direction (Z-direction)). Note that the lower part of FIG. 9 also shows sectional views of the bundle joining section 60 at three different locations in the longitudinal direction of the bundle joining section 60 (sectional views taken along an XY plane perpendicular to the longitudinal direction). Shown on the left side of FIG. 9 is the plurality of the optical fiber ribbons 7 in a stacked state. Note that the plurality of the optical fiber ribbons 7 are inserted into the bundle joining section 60 with the intersection-formed bundling members 10 being wrapped around the outer circumference thereof as shown in FIG. 9 (and FIG. 3).

The bundle joining section 60 has a unit passage portion 61 (a through hole) through which to pass the optical fiber unit 2 (the plurality of the optical fiber ribbons 7 and the bundling members 10). The bundle joining section 60 also has a squeeze portion 62, a first tapered portion 63A, and a second tapered portion 63B.

The squeeze portion 62 is a portion that squeezes thin the bundle of optical fibers 8 which is formed by a plurality of optical fiber ribbons 7. When the plurality of the optical fiber ribbons 7 and the bundling members pass through the squeeze portion 62, the bundling members are heated by the inner wall surface (heater) of the squeeze portion 62, fusing the intersections of the two bundling members. A dimension W1 is narrower than a dimension W0 (W1<W0) where W0 is the dimension of the stacked optical fiber ribbons 7 in the ribbon width direction (the X-direction) and W1 is the dimension of the unit passage portion 61 at the squeeze portion 62 in the same direction (the X-direction). Thus, in fusing and coupling the intersections of the two bundling members, the inner wall surface of the unit passage portion 61 can be brought into contact with the optical fiber ribbons 7 to deform the optical fiber ribbons 7 relative to the ribbon width direction.

The first tapered portion 63A is a tapered portion located closer to the entrance side (the upstream side) than the squeeze portion 62. By having the first tapered portion 63A, the optical fibers 8 can be guided to the squeeze portion 62 without excessively stressing the optical fibers 8. The second tapered portion 63B is a tapered portion located closer to the exit side (the downstream side) than the squeeze portion 62. By having the second tapered portion 63B, a drastic force can be prevented from being applied to the joint portions 15 of the bundling members 10 and the joint portions 15 can be prevented from coming undone.

In the first manufacturing method, the inner wall surface of the squeeze portion 62 and the optical fiber ribbons 7 are brought into contact with each other so that the optical fiber ribbons 7 may be deformed relative to the ribbon width direction. In addition, in the first manufacturing method, a cross section of the squeeze portion 62 is oval in shape and is symmetric with respect to the short axis. By passing the plurality of the optical fiber ribbons 7 stacked in the long axis direction (the Y-direction) through the squeeze portion 62 which is symmetric with respect to the short axis, the plurality of the optical fiber ribbons 7 can be guided so that the ribbon surface of the optical fiber ribbon 7 located upward of the short axis may deform in a direction opposite from the deformation of the ribbon surface of the optical fiber ribbon 7 located downward of the short axis. This as a result can prevent, in a cross section of the optical fiber unit 2, the bending directions of the plurality of the optical fiber ribbons 7 from being one-sided toward a particular direction so that the length of the vector GU may be shorter than the largest length of the vectors MG.

Note that the method for making the stacking state of the plurality of the optical fiber ribbons 7 irregular is not limited to the above method. For example, the stacking state may be made irregular not at the time of fusing the bundling members 10, but at the time of, for example, assembling the plurality of the optical fiber ribbons 7 as will be described next.

Figure 10:
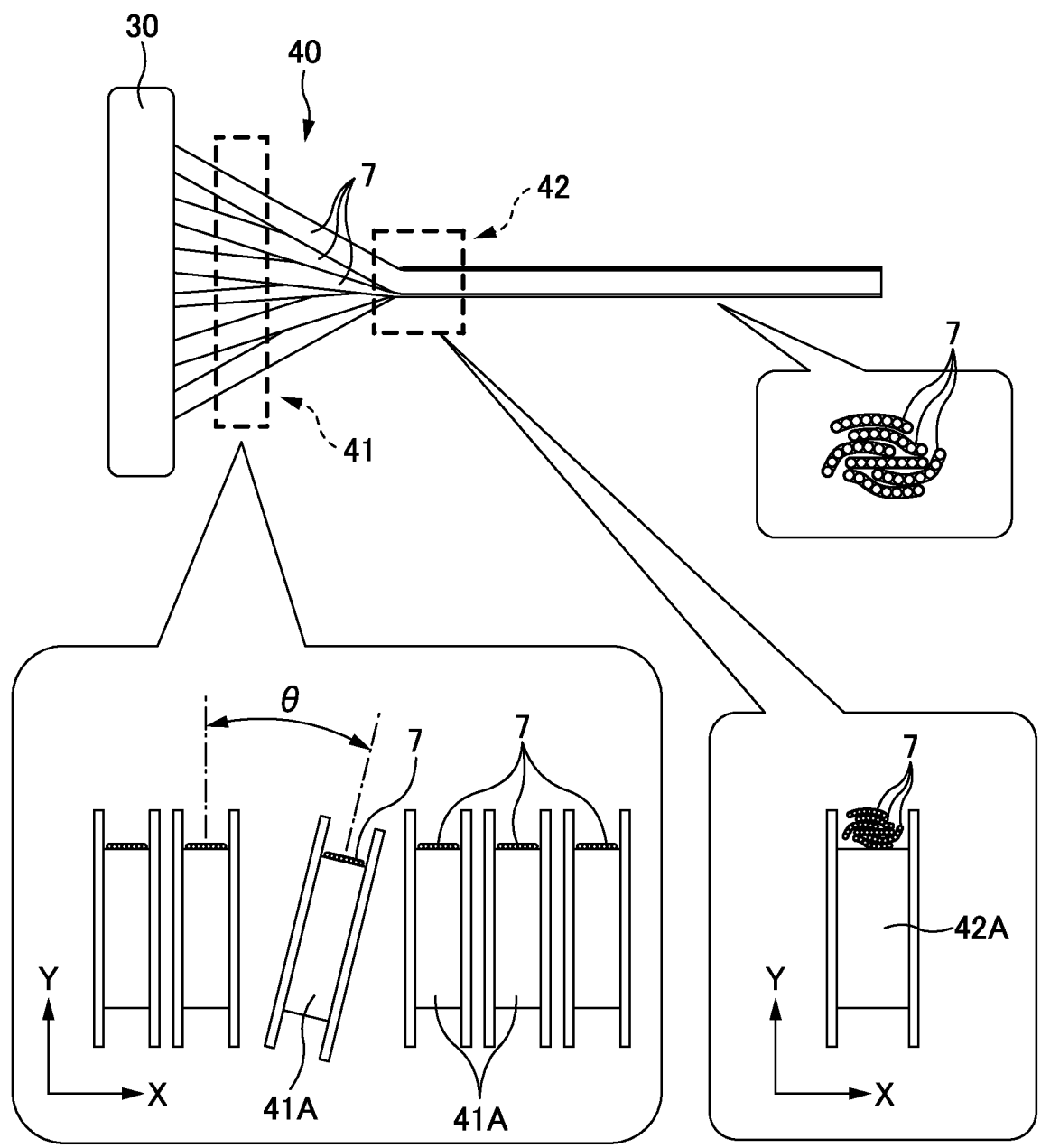
FIG. 10 is a diagram illustrating a second method for manufacturing the optical fiber unit 2 in an irregularly stacked state.

FIG. 10 is a diagram illustrating another method for manufacturing the optical fiber unit 2 in an irregularly-stacked state, and is a diagram illustrating a method for making the stacking state irregular at the time of assembling the plurality of the optical fiber ribbons 7. The assembling section 40 has an intermediate member 41 and an assembling member 42. Here, the intermediate member 41 is formed of a plurality of conveyance rollers 41A, and the assembling member 42 is formed by an assembling roller 42A. However, the configurations of the intermediate member 41 and the assembling member 42 are not limited to the above.

The conveyance rollers 41A are rollers (rotation bodies, including pulleys and roller carriers) for conveying the optical fiber ribbons 7. Each conveyance roller 41A conveys one optical fiber ribbon 7. The assembling roller 42A is a roller for conveying the plurality of assembled optical fiber ribbons 7. The assembling roller 42A conveys the plurality of the optical fiber ribbons 7 in an assembled state. Here, as shown in FIG. 10, a direction parallel to the rotation axis of the assembling roller 42A is the X-direction. Also, a direction perpendicular to the X-direction and the longitudinal direction of the optical fiber ribbons 7 is the Y-direction (the longitudinal direction of the optical fiber ribbons 7 is the Z-direction).

As shown in FIG. 10, the rotation axis of at least one of the conveyance rollers 41A is placed to be slanted relative to the rotation axes of the other conveyance rollers 41A. Specifically, the rotation axes of five conveyance rollers 41A are parallel to the X-direction, whereas the rotation axis of one conveyance roller 41A is slanted relative to the X-direction by an angle θ. When the plurality of the optical fiber ribbons 7 are assembled with the ribbon surface of a given optical fiber ribbon 7 being slanted relative to the ribbon surfaces of the other optical fiber ribbons 7, the plurality of the optical fiber ribbons 7 can be assembled in an irregularly-stacked state.

Also, the rotation axis of the conveyance roller 41A that conveys the optical fiber ribbon 7 located in a center portion in the Y-direction when the plurality of the optical fiber ribbons 7 are assembled is placed to be slanted relative to the rotation axes of the other conveyance rollers 41A. As a result, the optical fiber ribbons 7 can be guided so that the deformation of the ribbon surface may be opposite between the optical fiber ribbon 7 located on the +Y-direction side of the slanted optical fiber ribbon and the optical fiber ribbon 7 located on the -Y-direction side of the slanted optical fiber ribbon. The bending directions of the plurality of the optical fiber ribbons 7 can thus be not one-sided toward a particular direction so that the length of the vector GU may be shorter than the largest length of the vectors MG in a cross section of the optical fiber unit 2.

Incidentally, in the manufacturing method shown in FIG. 9, the curvatures of the optical fiber ribbons 7 can be adjusted by, for example, changing the shape of the unit passage portion 61 (the shapes of the squeeze portion 62, the first tapered portion 63A, and the second tapered portion 63B). For example, narrowing the dimension W1 of the squeeze portion 62 in the ribbon width direction can increase the curvatures of the optical fiber ribbons 7.

Also, in the manufacturing method shown in FIG. 10, the curvatures of the optical fiber ribbons 7 can be adjusted by, for example, changing the slant θ of the conveyance roller 41A. For example, increasing the slant θ of the conveyance roller 41A can increase the curvatures of the optical fiber ribbons 7.

Note that the methods for changing (methods for adjusting) the curvatures of the optical fiber ribbons 7 are not limited to the changing of the shape of the unit passage portion 61 (see FIG. 9) or the changing of the slant of the conveyance roller 41A (see FIG. 10). Also, the curvatures of the optical fiber ribbons 7 can be changed even in an optical cable which is manufactured by a method different from the manufacturing methods shown in FIGS. 9 and 10 or which is without bundling members or has a different type of bundling material.

For example, it is possible to adjust the curvatures of the optical fiber ribbons 7 by changing the location, shape, or physical property of the coupling parts 9A (see FIG. 2) of the optical fiber ribbon 7. For example, it is possible to increase the curvatures of the optical fiber ribbons 7 by lengthening the longitudinal intervals of the coupling parts 9A intermittently formed in the longitudinal direction, shortening the longitudinal dimension of each coupling part 9A, or decreasing the Young's modulus of the coupling part 9A.

Changing the shape of the optical cable 1 can also adjust the curvatures of the optical fiber ribbons 7. For example, it is possible to adjust the curvatures of the optical fiber ribbons 7 by changing, e.g., the packaging density of optical fibers in an optical cable or the number of fillings such as the bundling members. Note that the packaging density of optical fibers in an optical cable is the number of optical fibers per 1 mm$^2$ on an area obtained by subtracting the cross-sectional areas of members other than the optical fibers from the cross-sectional area of the inside of a sheath, and thus, it is possible to change the packaging density by changing, e.g., the cross-sectional area of the inside of the sheath, the cross-sectional areas of the members other than the optical fibers (fillings such as the bundling members), or the number of optical fibers, and the curvatures of the optical fiber ribbons 7 can thus be adjusted. For example, it is possible to increase the curvatures of the optical fiber ribbons 7 by increasing the packaging density of the optical fibers in the optical cable or increasing the number of the bundling members. Note that it is also possible to adjust the curvatures of the optical fiber ribbons 7 by, for example, changing the position of a filling disposed inside the optical cable.

As described above, by adjustment of the curvatures of the optical fiber ribbons 7, the lengths of the vectors MG on a cross section of the optical cable can be adjusted to make the length of the vector GU shorter than the largest length of the vectors MG. Note that by adjusting the curvatures of the optical fiber ribbons 7, it is possible to adjust not only the lengths of the vectors MG, but also the variance of the vectors MG (to be described later), the end-to-end distances of the optical fiber ribbons 7 (to be described later), and the variance of the end-to-end distances (to be described later) so that they may meet a predetermined condition.

EXAMPLES

As examples, optical cables with 864 fibers were created. Each optical fiber unit was formed by six intermittently-coupled optical fiber ribbons bundled with bundling members wrapped therearound in an S-Z configuration. Each optical cable was obtained by twisting in an S-Z configuration 12 optical fiber units, wrapping the 12 twisted optical fiber units up with a wrapping tape, and coating the outer side of the wrapping tape with a sheath. Here, a plurality of kinds of optical cables were created, varying the packaging density of the optical fibers in each optical cable in a range from 8 fibers mm$^2$ to 20 fibers mm$^2$. Note that the packaging density is a value obtained by dividing the number of optical fibers inside a sheath (864 fibers here) by an area obtained by subtracting the cross-sectional areas of members other than the optical fibers (such as the wrapping tape and fillings) from the cross-sectional area inside the sheath. In other words, a packaging density is the number of optical fibers per 1 mm$^2$ on an area obtained by subtracting the cross-sectional areas of members other than the optical fibers from the cross-sectional area of the inside of the sheath.

Also, to evaluate each optical cable, loss temperature property evaluations were performed under the condition of two cycles of −40° C./+70° C. Note that an increase amount of the maximum transmission loss of each optical cable was measured using a measurement wavelength of 1550 nm and conforming to GR-20-CORE Issue 4, 6.6.4.3 Optical Acceptance Criteria. The optical cable was evaluated to be "good" when the measurement result was 0.15 dB/km or smaller and was evaluated to be "poor" when the measurement result was above 0.15 dB/km.

Example 1

A cross section of each optical cable was photographed, and as already described, the XY coordinates of each optical fiber 8 were measured based on the photograph (two-dimensional image) of the cross section of the optical cable, and then the vectors MG of the optical fiber ribbons and the vector GU were measured in each optical fiber unit. For each optical fiber ribbon in the n-th unit (n: 1 to 12), a value obtained by dividing the length of the vector GU by the vector MG was calculated, and the smallest value for the n-th unit (the smallest value of values obtained by dividing the length of the vector GU by the vectors MG of the plurality of the optical fiber ribbons forming the n-th unit) was set to Xn. Also, the smallest value of Xn in all the units in the optical cable was set to Xmin. Note that Xn being below 1 means that, in that optical fiber unit, the length of the vector GU is shorter than the largest length of the vectors MG of the plurality of the optical fiber ribbons. Also, Xmin being below 1 means that, in at least one of the optical fiber ribbons in the optical cable, the length of the vector GU is shorter than the largest length of the vectors MG of the plurality of the optical fiber ribbons.

Figures 11A, 11B:
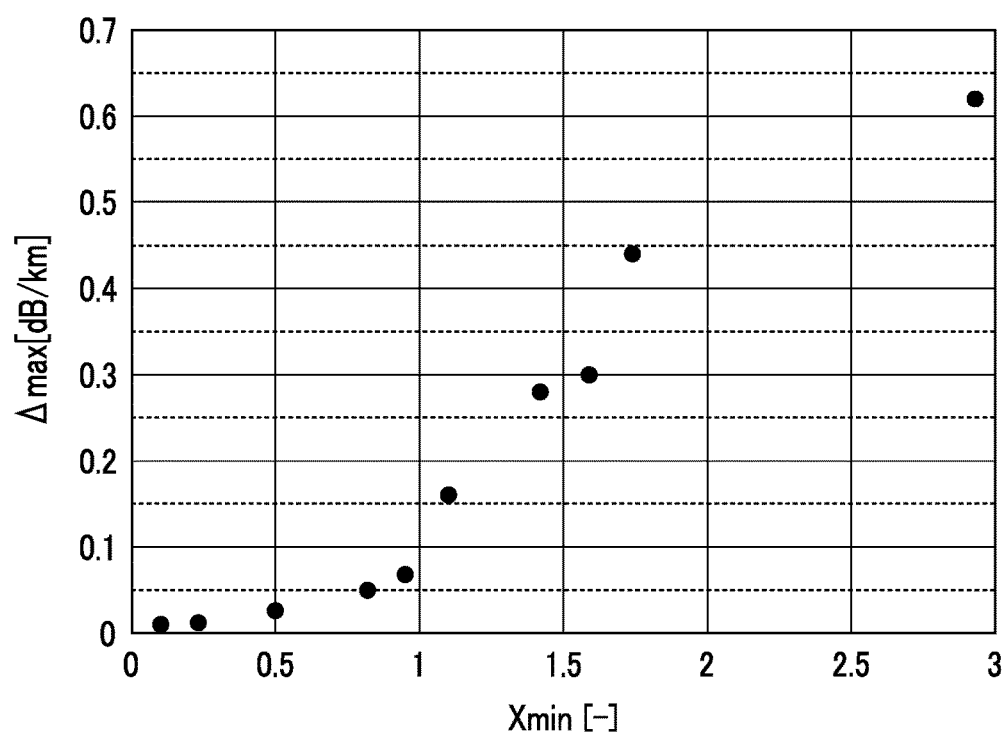
FIG. 11A is a table showing measurement results of Xmin and a maximum transmission loss increase amount Δmax of each optical cable.
FIG. 11B is a graph showing the measurement results of Xmin and the maximum transmission loss increase amount Δmax of each optical cable.

FIG. 11A is a table showing measurement results of Xmin and the maximum transmission loss increase amount Δmax of each optical cable. FIG. 11B is a graph showing the measurement results of Xmin and the maximum transmission loss increase amount Δmax of each optical cable.

As shown in FIG. 11A, when Xmin was below 1, the maximum transmission loss increase amount Δmax was 0.15 dB/km or smaller (evaluated to be good). Also, as shown in FIG. 11B, when Xmin was above 1, the maximum transmission loss increase amount Δmax increased notably. For this reason, Xmin may be below 1. Thus, in at least one of the optical fiber units in an optical cable, the length of the vector GU may be shorter than the largest length of the vectors MG of the plurality of the optical fiber ribbons.

Example 2: Lengths of the Vectors MG

FIG. 12 is a table showing the relations between the lengths of the vectors MG (nondimensionalized) and evaluation results of a bending under tension test.

FIG. 12 shows nondimensionalized values of the lengths of the vectors MG. Specifically, the nondimensionalized length of a vector MG is a value obtained by dividing the length L of the vector MG by L0 (L/L0) where L is the length of the vector MG based on the XY coordinates on a photograph (two-dimensional image) of a cross section of the optical cable 1 of one or more embodiments, and L0 is the center-to-center distance between the optical fibers 8 at both ends of the optical fiber ribbon 7 in a flat state (see the first comparative example) (L0 is equivalent to a length of 2.75 on the XY coordinates).

FIG. 12 also shows the evaluation results of a bending under tension test. The bending under tension test was carried out based on IEC60794-1-21 Method E18A, under the conditions of a tension of 2700 N or 1350 N, a mandrel diameter of 600 mm, and a bend angle of 90°. After the bending under tension test, the optical cable was dismantled to evaluate if there was any breakage of the coupling parts 9A of the optical fiber ribbons 7. The optical cable was evaluated to be excellent if there was no breakage of the coupling parts 9A under the tension of both of 2700 N and 1350 N, evaluated to be good if there was no breakage of the coupling parts 9A under the tension of 1350 N, and evaluated to be poor if there was breakage of the coupling parts 9A under the tension of both of 2700 N and 1350 N.

As shown in FIG. 12, when L/L0 was 0.242 or greater, breakage of the coupling parts 9A of the optical fiber ribbons 7 was observed under the tension of both of 2700 N and 1350 N. Note that when L/L0 is a large value, the optical fiber ribbons 7 tend to deform and bend sharply on a cross section of the optical cable, and thus, it is thought that when L/L0 was 0.242 or greater, the optical fiber ribbons 7 deformed and bent so sharply that the coupling parts 9A of the optical fiber ribbons 7 broke. For this reason, L/L0 indicating the length of the vector MG (nondimensionalized) may be 0.225 or smaller (L/L0≤0.225).

As shown in FIG. 12, when L/L0 was in a range of 0.008 or greater and 0.225 or smaller, there was no breakage of the coupling parts 9A of the optical fiber ribbons 7 after the bending under tension test under the condition of the tension of 1350 N. For this reason, L/L0 indicating the length of the vector MG (nondimensionalized) may be 0.008 or greater and 0.225 or smaller, (0.008≤L/L0≤0.225). Also, when L/L0 was in a range of 0.008 or greater and 0.149 or smaller, there was no breakage of the coupling parts 9A of the optical fiber ribbons 7 after the bending under tension test even under the condition of the tension of 2700 N. For this reason, L/L0 indicating the length of the vector MG (nondimensionalized) may be 0.008 or greater and 0.149 or smaller (0.008≤L/L0≤0.149).

Note that in a state where the ribbon surfaces of the optical fiber ribbons 7 are curved, because the midpoint M and the center of gravity G are usually placed offset from each other (it is extremely rare that the midpoint M and the center of gravity G coincide with each other), an evaluation result for a case where L/L0 was 0 was not obtained in the example shown in FIG. 12. However, when L/L0 is 0, it can be assumed that there would be no breakage of the coupling parts 9A because the optical fiber ribbons 7 would not deform in a bending manner. For this reason, L/L0 indicating the length of the vector MG (nondimensionalized) can include a case of 0, and thus, L/L0 may be 0 or greater and 0.225 or smaller (0≤L/L0≤0.225) and may further be 0 or greater and 0.149 or smaller. In other words, L/L0 indicating the length of the vector MG (nondimensionalized) may be 0.225 or smaller (L/L0≤0.225), and further may be 0.149 or smaller.

L/L0 indicating the length of the vector MG (nondimensionalized) does not have to be 0.225 or smaller (or 0.149 or smaller) in all the optical fiber ribbons 7 of the optical cable 1 in a cross section perpendicular to a longitudinal direction. In other words, it suffices if L/L0 indicating the length of the vector MG (nondimensionalized) is 0.225 or smaller (or 0.149 or smaller) in at least one of the optical fiber ribbons 7 of the optical cable 1 on a cross section perpendicular to a longitudinal direction. This helps prevent, in that cross section, breakage of the coupling parts 9A of at least that optical fiber ribbon 7. Nonetheless, L/L0 indicating the length of the vector MG (nondimensionalized) may be 0.225 or smaller (or 0.149 or smaller) in all the optical fiber ribbons 7 forming the optical fiber unit 2. This helps prevent breakage of the coupling parts 9A of all the optical fiber ribbons 7 forming the optical fiber unit 2.

Example 3: Variance of the Vectors MG

Figures 13A, 13B:
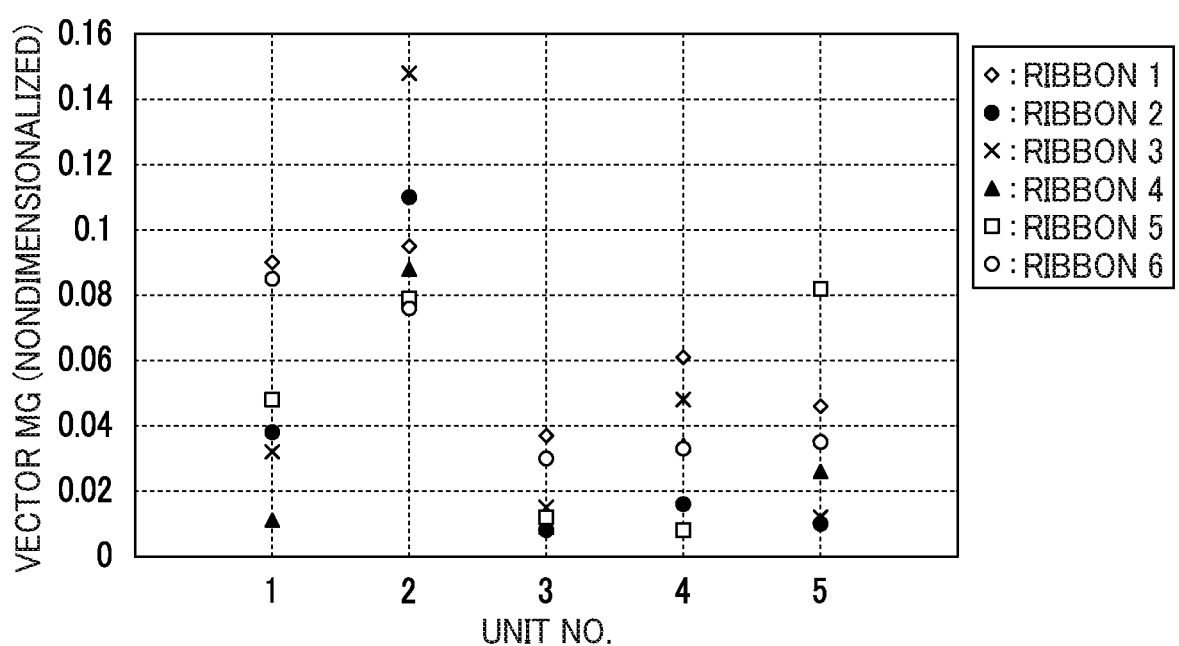
FIG. 13A is a table showing the lengths of the vectors MG (nondimensionalized) and variance of the lengths of the vectors MG in each of the plurality of optical fiber units 2.
FIG. 13B is a graph showing the variance of the vectors MG in each optical fiber unit 2.

FIG. 13A is a table showing the lengths of the vectors MG (nondimensionalized) and the variance of the lengths of the vectors MG for each of a plurality of optical fiber units 2 in a given optical cable. FIG. 13B is a graph showing the variances of the vectors MG of the plurality of optical fiber units 2 in the given optical cable. Note that the values shown in FIGS. 13A and 13B are nondimensionalized lengths of the vectors MG. Specifically, the nondimensionalized length of a vector MG is a value obtained by dividing the length L of the vector MG by L0 (L/L0) where L is the length of the vector MG based on the XY coordinates on a photograph (two-dimensional image) of a cross section of the optical cable 1 of one or more embodiments, and L0 is the center-to-center distance between the optical fibers 8 at both ends of the optical fiber ribbon 7 in a flat state (see the first comparative example) (L0 is equivalent to a length of 2.75 on the XY coordinates).

As shown in FIGS. 13A and 13B, in the optical cable 1 of one or more embodiments, the lengths of the vectors MG vary in each optical fiber unit 2. By contrast, in the first comparative example described earlier, six optical fiber ribbons 7 are stacked regularly, and thus the lengths of the vectors MG do not vary (the standard deviation of the lengths of the vectors MG is almost zero). In a case where the lengths of the vectors MG vary like in the embodiments described above, the plurality of the optical fiber ribbons 7 forming each optical fiber unit 2 are bent almost randomly, and thus, no matter which direction the optical cable 1 is bent, a stress given to the optical fibers 8 is easily distributed in that optical fiber unit 2, and load concentration at particular optical fibers 8 can be reduced compared to the first comparative example.

Thus, a plurality of kinds of optical cables were created with each satisfying 0.9<Xmin<1.0, and the influence by the variance of the vectors MG was also measured. Specifically, for each optical fiber ribbon in the n-th unit, a value was calculated by dividing the length L of the vector MG by L0 (L/L0; the nondimensionalized length of the vector MG), and the standard deviation of the values of L/L0 in the n-th unit (L/L0 of the plurality of the optical fiber ribbons forming the n-th unit) was set to Yn. Also, the smallest value of Yn among all the units in the optical cable was set to Ymin.

Figures 14A, 14B:
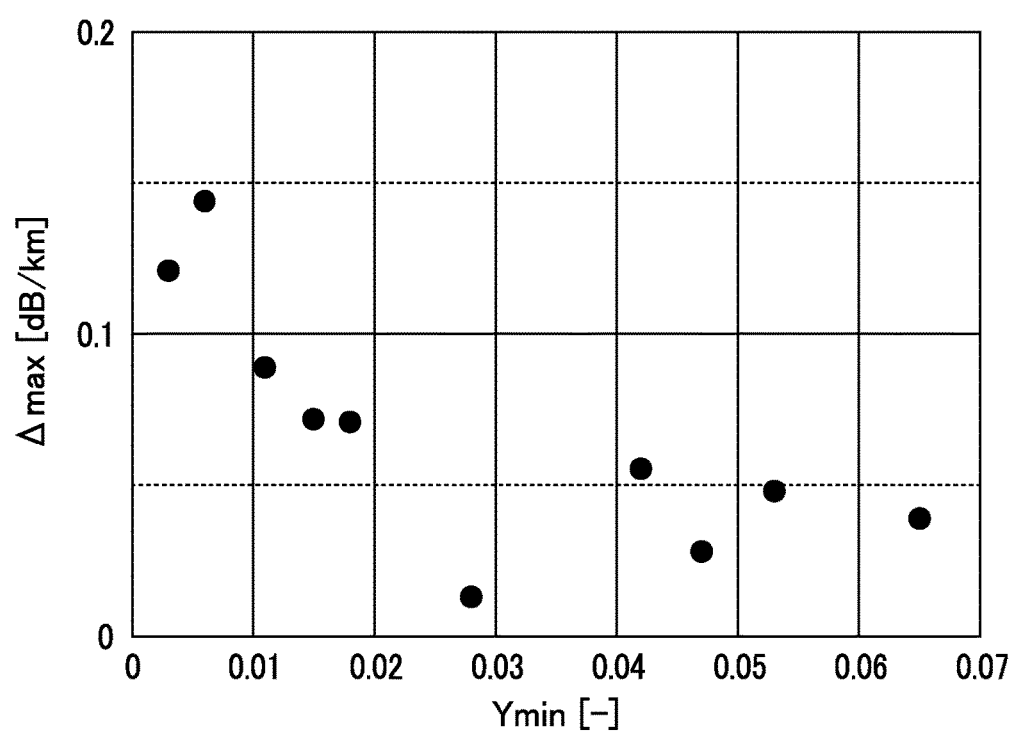
FIG. 14A is a table showing measurement results of Ymin and the maximum transmission loss increase amount Δmax of each optical cable.
FIG. 14B is a graph showing the measurement results of Ymin and the maximum transmission loss increase amount Δmax of each optical cable.

FIG. 14A is a table showing measurement results of Ymin and the maximum transmission loss increase amount Δmax of each optical cable. FIG. 14B is a graph showing the measurement results of Ymin and the maximum transmission loss increase amount Δmax of each optical cable. Here, the maximum transmission loss increase amount of each optical cable was measured using a measurement wavelength of 1550 nm and conforming to GR-20-CORE Issue 4, 6.6.4.3 Optical Acceptance Criteria, and the optical cable was evaluated to be "good" when the measurement result was 0.15 dB/km or smaller and was evaluated to be "excellent" when the measurement result was 0.10 dB/km or smaller.

As shown in FIG. 14A, when Ymin was 0.011 or greater, the maximum transmission loss increase amount Δmax was 0.10 dB/km or smaller (evaluated to be excellent). Also, as shown in FIG. 14B, when Ymin was below 0.011, the maximum transmission loss increase amount Δmax was 0.15 dB/km or smaller, but the maximum transmission loss increase amount Δmax notably increased. Thus, Ymin may be 0.011 or greater. Thus, the standard deviation of the values of L/L0 (each being a length obtained by dividing the length L of the vector MG by the distance L0 between the optical fibers at both ends of the optical fiber ribbon in a flat state) may be 0.011 or greater.

Note that the standard deviation of L/L0 does not have to be 0.011 or greater in all the optical fiber units 2 in the optical cable 1. In other words, it suffices if the standard deviation of L/L0 is 0.011 or greater in at least one of the optical fiber units 2. Then, the lengths of the vectors MG vary at least in that optical fiber unit 2, which makes it easy for a stress given to the optical fibers to be distributed, thereby reducing load concentration at particular optical fibers. Nonetheless, the standard deviation of L/L0 may be 0.011 or greater in all the optical fiber units 2 in the optical cable 1 as shown in the present example. Then, the lengths of the vectors MG vary in all the optical fiber units 2, which makes it easy for a stress given to the optical fibers to be distributed, thereby reducing load concentration at particular optical fibers.

Example 4: End-to-End Distance

FIG. 15 is a table showing the end-to-end distances (nondimensionalized) of the optical fiber ribbons 7 and evaluation results of a bending under tension test.

FIG. 15 shows nondimensionalized values of the center-to-center distance between the optical fibers 8 at both ends of the optical fiber ribbon 7 (an end-to-end distance). Specifically, the nondimensionalized end-to-end distance is a value obtained by dividing L1 by L0 (L1/L0) where L1 is the center-to-center distance between the optical fibers 8 at both ends of the optical fiber ribbon 7 on the XY coordinates on a photograph (two-dimensional image) of a cross section of the optical cable 1 of the embodiments described above, and L0 is the center-to-center distance between the optical fibers 8 at both ends of the optical fiber ribbon 7 in a flat state (see the first comparative example).

FIG. 15 also shows evaluation results of a bending under tension test. The method, conditions, and evaluation of the bending under tension test are the same as those in Example 2 described above.

As shown in FIG. 15, when L1/L0 was 0.135 or smaller, breakage of the coupling parts 9A was observed under the condition of the tension of both of 2700 N and 1350 N. Note that when L1/L0 is a small value, the optical fiber ribbons 7 tend to fold and deform on a cross section of the optical cable, and thus, it is thought that when L1/L0 was 0.135 or smaller, the optical fiber ribbons 7 folded and deformed so much that the coupling parts 9A of the optical fiber ribbons 7 broke.

Also, as shown in FIG. 15, when L1/L0 was 1.633 or greater, breakage of the coupling parts 9A of the optical fiber ribbons 7 was observed under either one of the tensions of 2700 N and 1350 N. The larger L1/L0 is beyond 1, the more the coupling parts 9A of the optical fiber ribbon 7 are pulled in the ribbon width direction, and thus, it is thought that when L1/L0 was 1.633 or greater, the coupling parts 9A of the optical fiber ribbon 7 were pulled in the ribbon width direction so much that the coupling parts 9A broke.

By contrast, as shown in FIG. 15, when L1/L0 was in a range of 0.205 or greater and 1.490 or smaller, there was no breakage of the coupling parts 9A of the optical fiber ribbons 7 after the bending under tension test under the condition of the tension of 1350 N. For this reason, L1/L0 indicating the end-to-end distance (nondimensionalized) of the optical fiber ribbon 7 may be 0.205 or greater and 1.490 or smaller (0.205≤L1/L0≤1.490). Also, when L1/L0 was in a range of 0.490 or greater and 1.267 or smaller, there was no breakage of the coupling parts 9A of the optical fiber ribbons 7 after the bending under tension test even under the condition of the tension of 2700 N. For this reason, L1/L0 indicating the end-to-end distance (nondimensionalized) of the optical fiber ribbon 7 may be 0.490 or greater and 1.267 or smaller (0.490≤L1/L0 ≤1.267).

L1/L0 indicating the end-to-end distance (nondimensionalized) does not have to be 0.205 or greater and 1.490 or smaller (or 0.490 or greater and 1.267 or smaller) in all the optical fiber ribbons 7 of the optical cable 1 in a cross section perpendicular to a longitudinal direction. In other words, it suffices if L1/L0 indicating the end-to-end distance (nondimensionalized) is 0.205 or greater and 1.490 or smaller, (or 0.490 or greater and 1.267 or smaller) in at least one of the optical fiber ribbons 7 on a cross section perpendicular to a longitudinal direction. This can prevent, in that cross section, breakage of the coupling parts 9A of at least that optical fiber ribbon 7. Nonetheless, L1/L0 indicating the end-to-end distance (nondimensionalized) may be 0.205 or greater and 1.490 or smaller (or 0.490 or greater and 1.267 or smaller) in all the optical fiber ribbons 7 forming the optical fiber unit 2. This can prevent breakage of the coupling parts 9A of all the optical fiber ribbons 7 forming the optical fiber unit 2.

Example 5: Variance of the End-to-End Distances

Figures 16A, 16B:
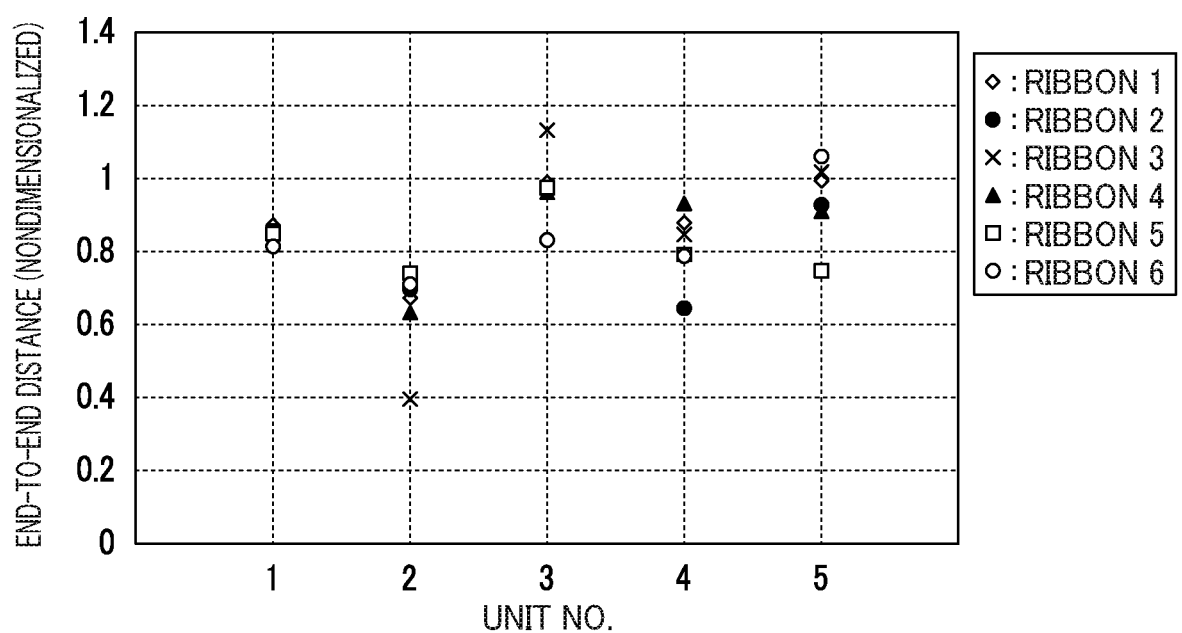
FIG. 16A is a table showing the end-to-end distances (nondimensionalized) of the optical fiber ribbons 7 and the variance of the end-to-end distances in each of the plurality of optical fiber units 2.
FIG. 16B is a graph showing the variance of the end-to-end distances in each optical fiber unit 2.

FIG. 16A is a table showing the end-to-end distances (nondimensionalized) of the optical fiber ribbons 7 and the variance of the end-to-end distances in each of the plurality of optical fiber units 2. FIG. 16B is a graph showing the variance of the end-to-end distances in each of the optical fiber units 2. Note that the values shown in FIGS. 16A and 16B are nondimensionalized center-to-center distances between the optical fibers 8 at both ends of the optical fiber ribbons 7 (end-to-end distances). Specifically, a nondimensionalized end-to-end distance is a value obtained by dividing L1 by L0 (L1/L0) where L1 is the center-to-center distance between the optical fibers 8 at both ends of the optical fiber ribbon 7 on the XY coordinates on a photograph (two-dimensional image) of a cross section of the optical cable 1 of the embodiments described above, and L0 is the center-to-center distance between the optical fibers 8 at both ends of the optical fiber ribbon 7 in a flat state (see the first comparative example).

As shown in FIGS. 16A and 16B, in the optical cable 1 of one or more embodiments, the end-to-end distances of the optical fiber ribbons 7 vary in each optical fiber unit 2. By contrast, in the first comparative example described earlier, six optical fiber ribbons 7 are stacked flatly, and thus the end-to-end distances do not vary (the standard deviation of the end-to-end distances is almost zero). In one or more embodiments, in a case where the end-to-end distances of the optical fiber ribbons 7 vary in every optical fiber unit 2, the plurality of the optical fiber ribbons 7 forming each optical fiber unit 2 are bent almost randomly, and thus, no matter which direction the optical cable 1 is bent, a stress given to the optical fibers 8 is easily distributed in that optical fiber unit 2, and load concentration at particular optical fibers 8 can be reduced compared to the first comparative example.

Thus, a plurality of kinds of optical cables were created with each satisfying 0.9<Xmin<1.0, and the influence by the variance of the end-to-end distances (L1/L0) was also measured. Specifically, for each optical fiber ribbon in the n-th unit, a value was calculated by dividing the center-to-center distance L1 between the optical fibers 8 at both ends of the optical fiber ribbon 7 by L0 (L1/L0; the nondimensionalized end-to-end distance), and the standard deviation of the values of L1/L0 in the n-th unit (L1/L0 of the plurality of the optical fiber ribbons 7 forming the n-th unit) was set to Zn. Also, the smallest value of Zn among all the units in the optical cable was set to Zmin.

Figures 17A, 17B:
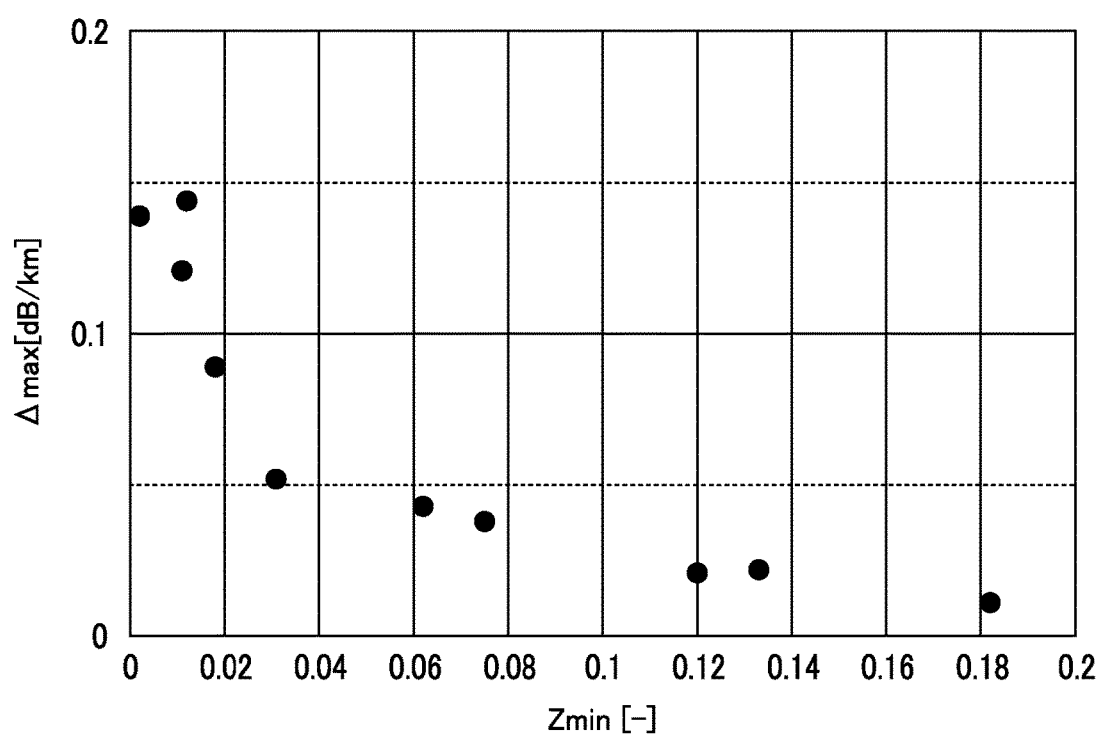
FIG. 17A is a table showing measurement results of Zmin and the maximum transmission loss increase amount Δmax of each optical cable.
FIG. 17B is a graph showing the measurement results of Zmin and the maximum transmission loss increase amount Δmax of each optical cable.

FIG. 17A is a table showing measurement results of Zmin and the maximum transmission loss increase amount Δmax of each optical cable. FIG. 17B is a graph showing the measurement results of Zmin and the maximum transmission loss increase amount Δmax of each optical cable. Here too, the maximum transmission loss increase amount of each optical cable was measured similarly, and the optical cable was evaluated to be "good" when the measurement result was 0.15 dB/km or smaller and was evaluated to be "excellent" when the measurement result was 0.10 dB/km or smaller.

As shown in FIG. 17A, when Zmin was 0.018 or greater, the maximum transmission loss increase amount Δmax was 0.10 dB/km or smaller (evaluated to be excellent). Also, as shown in FIG. 17B, when Zmin was below 0.018, the maximum transmission loss increase amount Δmax was 0.15 dB/km or smaller, but the maximum transmission loss increase amount Δmax notably increased. Thus, Zmin may be 0.018 or greater. In other words, the standard deviation of the values obtained by dividing the center-to-center length L1 between optical fibers 8 at both ends of the optical fiber ribbon 7 by L0 may be 0.018 or greater.

Note that the standard deviation of L1/L0 does not have to be 0.018 or greater in all the optical fiber units 2 in the optical cable 1. In other words, it suffices if the standard deviation of L1/L0 is 0.018 or greater in at least one of the optical fiber units 2. Then, the plurality of the optical fiber ribbons 7 are bent almost randomly at least in that optical fiber unit 2, and thus no matter which direction the optical cable 1 is bent, a stress given to the optical fibers 8 is easily distributed in that optical fiber unit 2, thereby reducing load concentration at particular optical fibers. Nonetheless, the standard deviation of L1/L0 may be 0.018 or greater in all the optical fiber units 2 in the optical cable 1 as shown in the present example. Then, in all the optical fiber units 2, the plurality of the optical fiber ribbons 7 forming each optical fiber unit 2 are bent almost randomly, and thus no matter which direction the optical cable 1 is bent, a stress given to the optical fibers 8 is easily distributed in that optical fiber unit 2, thereby reducing load concentration at particular optical fibers.

Comparison With Other Comparative Examples

FIG. 18 is a table comparing the cross-sectional shape of the optical fiber unit 2 of the embodiments described above with those of the comparative examples. Since the first comparative example has already been described (see FIG. 19), second to fourth comparative examples are mainly described here.

Second Comparative Example

Figure 20A:
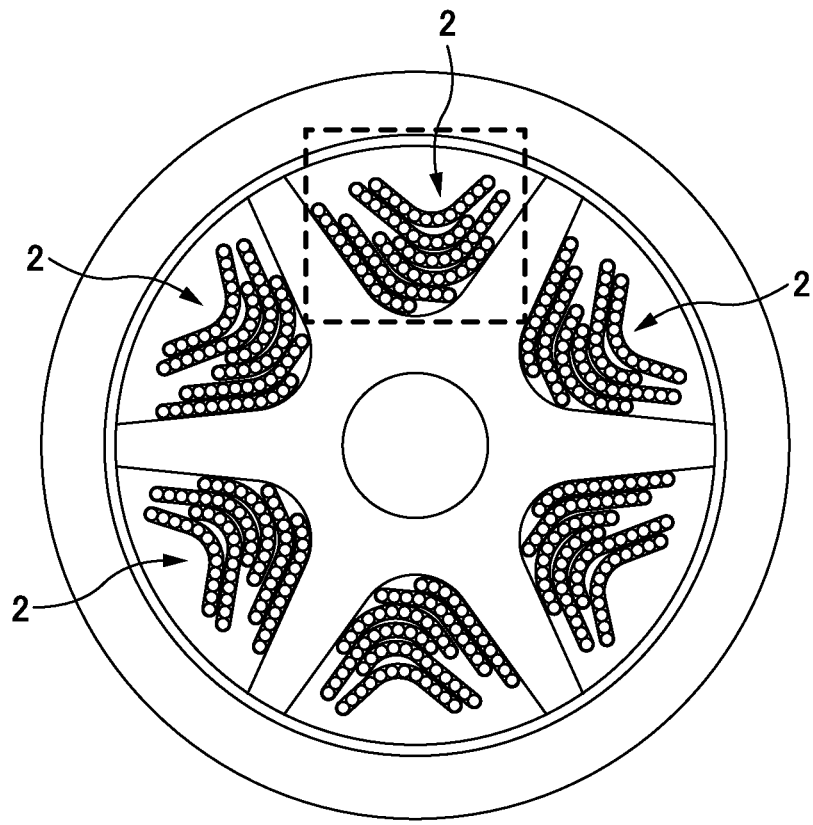
FIG. 20A is a cross-sectional view of an optical cable of a second comparative example.

FIG. 20A is a sectional view of an optical cable of the second comparative example.

The optical cable of the second comparative example is a slotted optical cable having a rod with a plurality of slots (grooves). In each slot, an optical fiber unit 2 formed by a plurality of optical fiber ribbons 7 is housed.

Figure 20B:
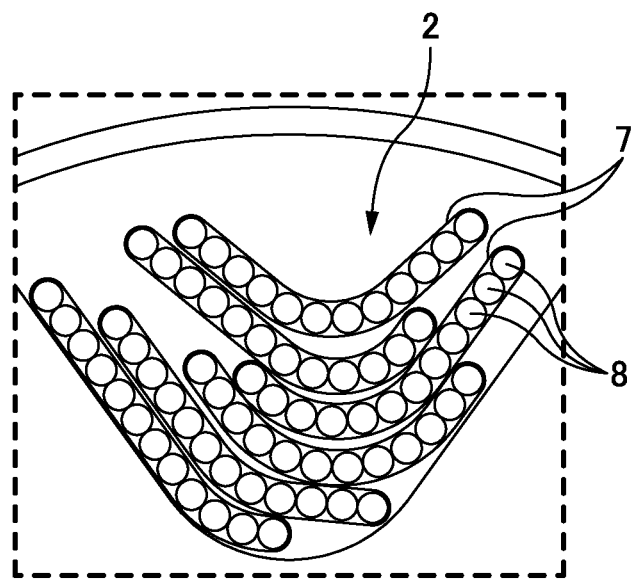
FIG. 20B is a diagram illustrating the cross-sectional shape of the optical fiber unit 2 of the second comparative example.

FIG. 20B is a diagram illustrating the cross-sectional shape of the optical fiber unit 2 of the second comparative example. In the second comparative example as well, the optical fiber ribbon 7 is formed of an intermittently-coupled optical fiber ribbon 7. As a result, in the second comparative example, the optical fiber ribbons 7 are deformed to lie along the inner wall surface of the slot. In other words, in the second comparative example, a plurality of optical fiber ribbons 7 housed in a common slot deform in the same way along the inner wall surface of the common slot. As a result, in the second comparative example, the vectors MG of the plurality of the optical fiber ribbons 7 forming the optical fiber unit 2 are oriented almost in the common direction, and the vector GU is therefore relatively long. In other words, in the second comparative example, the bending directions of the plurality of the optical fiber ribbons 7 are one-sided toward a particular direction. For this reason, in the second comparative example, load may be concentrated at particular optical fibers 8 when the optical cable is bent in a predetermined direction. Note that not only in a slotted optical cable like the one in the second comparative example but also in other optical cables in which the bending directions of the plurality of the optical fiber ribbons 7 are one-sided toward a particular direction, a load may be concentrated at particular optical fibers 8 when the optical cable is bent in a predetermined direction.

Also, in the second comparative example, in which the plurality of the optical fiber ribbons 7 bend in the same way along the inner wall surface of the common slot, the lengths of the vectors MG are unlikely to vary, and thus, the standard deviation of the lengths of the vectors MG is small compared to the embodiments described above. Thus, in the second comparative example, in which the plurality of the optical fiber ribbons 7 are arranged more regularly and less randomly than the embodiments described above, a load may be concentrated at particular optical fibers 8 when the optical cable is bent in a predetermined direction. Also, in the second comparative example, in which the plurality of the optical fiber ribbons 7 are thus deformed in the same way along the inner wall surface of the common slot, there is a small variance among the end-to-end distances (the standard deviation of L1/L0 of the plurality of the optical fiber ribbons 7 where L1 is the center-to-center distance between the optical fibers 8 at both ends of the optical fiber ribbon 7 and L0 is the center-to-center distance between the optical fibers 8 at both ends of the optical fiber ribbon 7 in a flat state). For this reason as well, in the second comparative example, a load may be concentrated at particular optical fibers 8 when the optical cable is bent in a predetermined direction.

Note that in the second comparative example, each of the optical fiber ribbons 7 tends to bend with its ribbon surface on the slot bottom side being convex. In other words, in the second comparative example, as shown in FIG. 20B, each optical fiber ribbon 7 is bent in one direction relative to the ribbon width direction. For this reason, in the second comparative example, a stress given to the optical fibers 8 is not easily distributed in the ribbon width direction.

Third Comparative Example

Figure 21A:
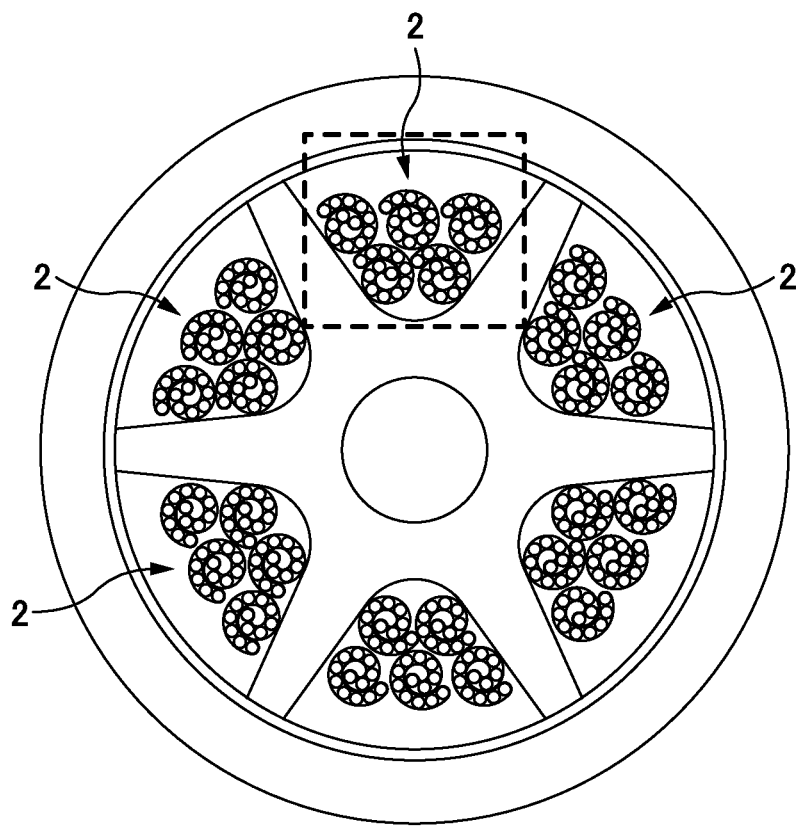
FIG. 21A is a cross-sectional view of an optical cable of a third comparative example.

FIG. 21A is a sectional view of an optical cable of the third comparative example. Like the second comparative example, the optical cable of the third comparative example is a slotted optical cable having a rod with a plurality of slots (grooves). In each slot, an optical fiber unit 2 formed by a plurality of optical fiber ribbons 7 is housed.

Figure 21B:
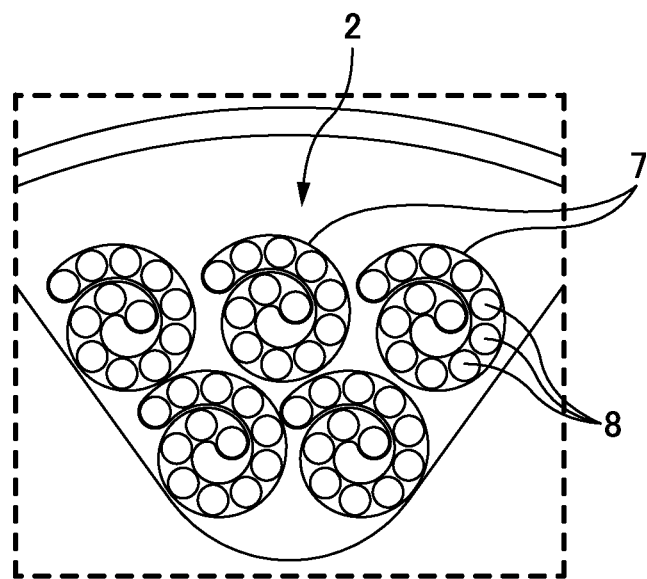
FIG. 21B is a diagram illustrating the cross-sectional shape of the optical fiber unit 2 of the third comparative example.

FIG. 21B is a diagram illustrating the cross-sectional shape of the optical fiber unit 2 of the third comparative example. In the third comparative example as well, the optical fiber ribbon 7 is formed of an intermittently-coupled optical fiber ribbon 7. In the third comparative example, the plurality of optical fibers 8 of each optical fiber ribbon 7 are disposed spirally. In other words, in the third comparative example, each of the optical fiber ribbons 7 is deformed in such a manner that its ribbon surface spirals. In the third comparative example, the vectors MG of the plurality of the optical fiber ribbons 7 forming the optical fiber unit 2 are oriented in the common direction, and thus, the vector GU is relatively long. In the third comparative example, the plurality of the optical fiber ribbons 7 are disposed regularly and not randomly, and thus, a load may be concentrated at particular optical fibers 8 when the optical cable is bent in a predetermined direction.

Also, because the plurality of the optical fiber ribbons 7 in the third comparative example are deformed in the same way such that their ribbon surfaces spiral, the lengths of the vectors MG are unlikely to vary, and thus, the standard deviation of the lengths of the vectors MG is small compared to the embodiments described above. Thus, in the third comparative example, in which the plurality of the optical fiber ribbons 7 are arranged more regularly and less randomly than the embodiments described above, a load may be concentrated at particular optical fibers 8 when the optical cable is bent in a predetermined direction. Also, in the third comparative example, in which the plurality of the optical fiber ribbons 7 are deformed in the same way such that their ribbon surfaces spiral, there is a small variance among the end-to-end distances (the standard deviation of L1/L0 of the plurality of the optical fiber ribbons 7). For this reason as well, in the third comparative example, a load may be concentrated at particular optical fibers 8 when the optical cable is bent in a predetermined direction.

Fourth Comparative Example

Figure 22A:
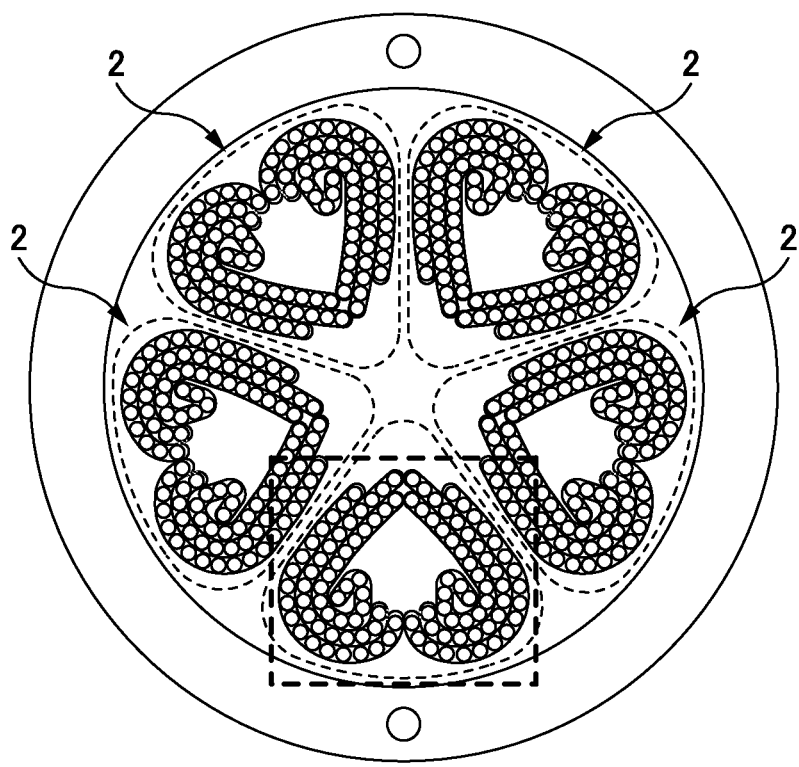
FIG. 22A is a cross-sectional view of an optical cable of a fourth comparative example.

FIG. 22A is a sectional view of an optical cable of the fourth comparative example. The optical cable of the fourth comparative example is, like in the embodiments described above, a slot-less optical cable. The optical cable of the fourth comparative example includes a plurality of optical fiber units 2 arranged equally circumferentially.

Figure 22B:
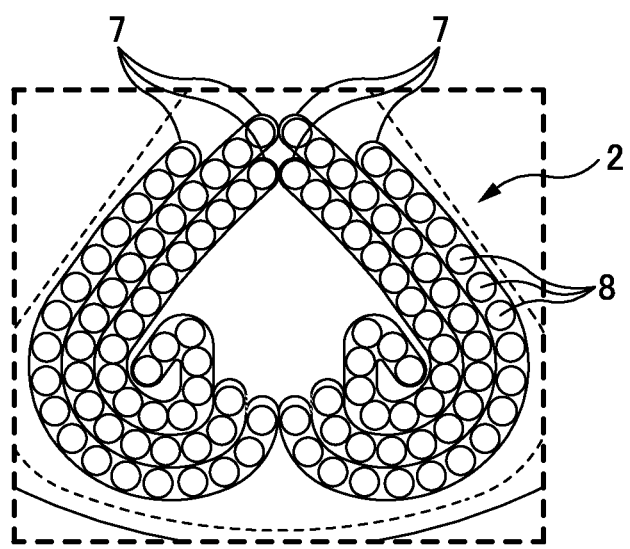
FIG. 22B is a diagram illustrating the cross-sectional shape of the optical fiber unit 2 of the fourth comparative example.

FIG. 22B is a diagram illustrating the cross-sectional shape of the optical fiber unit 2 of the fourth comparative example. The optical fiber unit 2 has a cross section of a fan shape (or a heart shape). Here, the optical fiber unit 2 includes six intermittently-coupled optical fiber ribbons 7. With three optical fiber ribbons 7 grouped as one set, two sets of the optical fiber ribbons 7 are disposed symmetrically to form the optical fiber unit 2. Three optical fiber ribbons 7 forming one set are disposed in such a manner as to be stacked and bent in the same direction. As a result, in the fourth comparative example, the vectors MG of the plurality of the optical fiber ribbons 7 forming the optical fiber unit 2 are oriented almost in the common direction, and thus, the vector GU is relatively long. In other words, in the fourth comparative example, the bending directions of the plurality of the optical fiber ribbons 7 are one-sided toward a particular direction. For this reason, in the fourth comparative example, a load may be concentrated at particular optical fibers 8 when the optical cable is bent in a predetermined direction.

Also, in the fourth comparative example, in which the plurality of the optical fiber ribbons 7 are such that three optical fiber ribbons 7 forming one set are stacked and bent in the same direction and two sets of the optical fiber ribbon 7 are disposed symmetrically, the lengths of the vectors MG are unlikely to vary. Thus, the standard deviation of the lengths of the vectors MG is small compared to the embodiments described above. For this reason, in the fourth comparative example, in which the plurality of the optical fiber ribbons 7 are arranged more regularly and less randomly than the embodiments described above, a load may be concentrated at particular optical fibers 8 when the optical cable is bent in a predetermined direction. Also, in the fourth comparative example, in which the plurality of the optical fiber ribbons 7 are such that three optical fiber ribbons 7 forming one set are stacked and bent in the same direction and two sets of the optical fiber ribbon 7 are disposed symmetrically, there is a small variance among the end-to-end distances (the standard deviation of L1/L0 of the plurality of the optical fiber ribbons 7). For this reason as well, in the fourth comparative example, a load may be concentrated at particular optical fibers 8 when the optical cable is bent in a predetermined direction.

Note that in the fourth comparative example, each optical fiber ribbon 7 is placed in such a manner as to be bent with its outer ribbon surface being convex. In other words, in the fourth comparative example, as shown in FIG. 22B, each optical fiber ribbon 7 is bent in one direction relative to the ribbon width direction. For this reason, in the fourth comparative example, a stress given to the optical fibers 8 is not easily distributed in the ribbon width direction.

Other Embodiments

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 optical cable
2 optical fiber unit
3 sheath
4 tension member
5 wrapping tape
7 optical fiber ribbon
8 optical fiber
9A coupling part
9B non-coupling part
10 bundling member
11 core part
12 coating part
15 joint portion
20 unit manufacturing apparatus
30 ribbon supply section
40 assembling section
50 bundle attaching section
50A fiber passage portion
51 first rotation member
51A first passage portion
52 second rotation member
52A second passage portion
60 bundle joining section
100 unit formation section

The invention claimed is:

1. An optical cable, comprising
optical fiber units each of which comprises intermittently-coupled optical fiber ribbons that are in an irregularly-stacked state, wherein
in at least one of the optical fiber units, in a cross section perpendicular to a longitudinal direction of the at least one of the optical fiber units, a length of a vector GU is shorter than a largest length of vectors MG of the intermittently-coupled optical fiber ribbons forming the at least one of the optical fiber units,
where,
in each of the intermittently-coupled optical fiber ribbons,
each of the vectors MG is a vector starting from M and ending at G,
M is a midpoint between optical fibers at both ends of the each of the intermittently-coupled optical fiber ribbons, and
G is a center of gravity of the each of the intermittently-coupled optical fiber ribbons, and
the vector GU is a resultant vector of the vectors MG.

2. The optical cable according to claim 1, wherein in all of the optical fiber units, in a cross section in a longitudinal direction, the length of the vector GU is shorter than the largest length of the vectors MG of the intermittently-coupled optical fiber ribbons.

3. The optical cable according to claim 2, wherein
the optical fiber units are twisted together, and
in all of the optical fiber units, in a cross section taken within a twisting pitch, the length of the vector GU is shorter than the largest length of the vectors MG of the intermittently-coupled optical fiber ribbons.

4. The optical cable according to claim 1, wherein each of the optical fiber units comprises a bundling material bundling the intermittently-coupled optical fiber ribbons.

5. The optical cable according to claim 1, wherein, in at least one of the intermittently-coupled optical fiber ribbons, L/L0 is 0.225 or smaller,
where
L is a length of a vector MG, and
L0 is a distance between the optical fibers at both ends of the at least one of the intermittently-coupled optical fiber ribbons in a flat state.

6. The optical cable according to claim 5, wherein L/L0 is 0.149 or smaller.

7. The optical cable according to claim 5, wherein L/L0 is 0.225 or smaller in all the intermittently-coupled optical fiber ribbons.

8. The optical cable according to claim 1, wherein a standard deviation of L/L0 is 0.011 or greater,
where
L is a length of each of the vectors MG, and
L0 is a distance between the optical fibers at both ends of each of the intermittently-coupled optical fiber ribbons in a flat state.

9. The optical cable according to claim 1, wherein in at least one of the intermittently-coupled optical fiber ribbons, L1/L0 is 0.205 or greater and 1.490 or smaller,
where L1 is a distance between the optical fibers at both ends of the at least one of the intermittently-coupled optical fiber ribbons, and L0 is a distance between the optical fibers at both ends of the at least one of the intermittently-coupled optical fiber ribbons in a flat state.

10. The optical cable according to claim 9, wherein L1/L0 is 0.490 or greater and 1.267 or smaller.

11. The optical cable according to claim 9, wherein L1/L0 is 0.205 or greater and 1.490 or smaller in all of the intermittently-coupled optical fiber ribbons.

12. The optical cable according to claim 1, wherein a standard deviation of L1/L0 of the intermittently-coupled optical fiber ribbons is 0.018 or greater
where
L1 is a distance between the optical fibers at both ends of each of the intermittently-coupled optical fiber ribbons, and L0 is a distance between the optical fibers at both ends of each of the intermittently-coupled optical fiber ribbons in a flat state.

13. The optical cable according to claim 1, wherein in the cross section, at least one of the intermittently-coupled optical fiber ribbons comprises:
a part that is bent with a side of a ribbon surface being convex; and
a part that is bent with an opposite side of the ribbon surface being convex.

14. An optical-cable manufacturing method comprising:
manufacturing optical fiber units each of which comprises intermittently-coupled optical fiber ribbons that are in an irregularly-stacked state; and
housing the optical fiber units inside a sheath, wherein
the manufacturing the optical fiber units comprises stacking the optical fiber units such that, in at least one of the optical fiber units, in a cross section perpendicular to a longitudinal direction of the at least one of the optical fiber units, a length of a vector GU is shorter than a largest length of vectors MG of the intermittently-coupled optical fiber ribbons forming the at least one of the optical fiber units,
where,
in each of the intermittently-coupled optical fiber ribbons,
each of the vectors MG is a vector starting from M and ending at G,
M is a midpoint between optical fibers at both ends of the each of the intermittently-coupled optical fiber ribbons, and
G is a center of gravity of the each of the intermittently-coupled optical fiber ribbons, and
the vector GU is a resultant vector of the vectors MG.

* * * * *